United States Patent [19]
Miller et al.

[11] Patent Number: 6,009,212
[45] Date of Patent: *Dec. 28, 1999

[54] METHOD AND APPARATUS FOR IMAGE REGISTRATION

[75] Inventors: Michael I. Miller; Gary E. Christensen; Sarang C. Joshi, all of St. Louis, Mo.; Ulf Grenander, Providence, R.I.

[73] Assignee: Washington University, St. Louis, Mo.

[ * ] Notice: This patent issued on a continued prosecution application filed under 37 CFR 1.53(d), and is subject to the twenty year patent term provisions of 35 U.S.C. 154(a)(2).

[21] Appl. No.: 08/678,628

[22] Filed: Jul. 10, 1996

[51] Int. Cl.$^6$ .............................. G06K 9/32; G06K 9/00; G06K 9/36

[52] U.S. Cl. .......................... 382/294; 382/131; 382/151; 382/291

[58] Field of Search .................................... 382/131, 151, 382/280, 291, 294, 276; 395/124, 125, 126; 378/4

[56] References Cited

U.S. PATENT DOCUMENTS

| | | | |
|---|---|---|---|
| 4,590,607 | 5/1986 | Kauth | 382/294 |
| 4,644,582 | 2/1987 | Morishita et al. | 382/130 |
| 4,662,222 | 5/1987 | Johnson | 73/602 |
| 4,958,283 | 9/1990 | Tawara et al. | 364/413.13 |
| 4,987,412 | 1/1991 | Vaitekunas et al. | 340/721 |
| 5,005,126 | 4/1991 | Haskin | 364/413.13 |
| 5,027,422 | 6/1991 | Peregrim et al. | 382/294 |
| 5,048,103 | 9/1991 | Leclerc et al. | 382/294 |
| 5,073,963 | 12/1991 | Sammons et al. | 382/294 |
| 5,241,472 | 8/1993 | Gur et al. | 364/413.22 |
| 5,272,625 | 12/1993 | Nishihara et al. | 364/413.13 |
| 5,274,551 | 12/1993 | Corby, Jr. | 364/413.13 |
| 5,287,417 | 2/1994 | Eller et al. | 382/276 |
| 5,291,401 | 3/1994 | Robinson | 364/413.13 |
| 5,351,310 | 9/1994 | Califano et al. | 382/276 |

(List continued on next page.)

OTHER PUBLICATIONS

PCT International Search Report, Nov. 14, 1997.
Galvin, Jeffrey R., et al., "Image Corner, The Virtual Hospital Providing Multimedia Decision Support Tools via the Internet", SPINE, vol. 20, No. 15, pp. 1735–1738, 1995.
"The Novel Hypermedia System for UNIX Workstations, VOXEL–MAN", Institute of Mathematics and Computer Science., pp. 1–5, 1995.
"The Electronic Clinical Brain Atlas: Three–Dimensional Navigation of the Human Brain", Thieme, Apr. 1996.
Written Opinion, PCT/US97/11563, International Preliminary Examining Authority, Sep. 21, 1998.
Bookstein, Fred L., et al., "Edge information at landmarks in medical images," *Visualization in Biomedical Computing*, SPIE vol. 1808, 1992, pp. 242–258.
Bookstein, Fred L., "Landmark Methods for Forms Without Landmarks: Localizing Group Differences in Outline Shape," *IEEE Proceedings of MMBIA '96*, 1996, pp. 279–289.
Bookstein, Fred L., "Visualizing Group Differences in Outline Shape: Methods from Biometrics of Landmark Points," Lecture Notes in Computer Science 1131, Visualizaton in Biomedical Computing, 4th International Conference, VBC '96, Sep. 1996, pp. 405–41–410.
Bookstein, Fred L., "Quadratic Variation of Deformations," Lecture Notes in Computer Science 1230, *Information processing in Medical Imaging*, 15th International Conference, IPMI '97, Jun. 1997, pp. 15–28.
Zorvech, S. James, M.D., "3–D in the OR OR role seen for 3–D imaging," *Radiology Today*, Feb. 1991.

*Primary Examiner*—Bipin H. Shalwala
*Attorney, Agent, or Firm*—Finnegan, Henderson, Farabow, Garrett & Dunner, L.L.P.

[57] ABSTRACT

An apparatus and method for image registration involves computing a first transform based on landmark manifolds, using a distance measure, computing a second transform from the distance measure and the first transform. Registering the images is accomplished by applying the second transform.

115 Claims, 8 Drawing Sheets

U.S. PATENT DOCUMENTS

| | | | |
|---|---|---|---|
| 5,367,580 | 11/1994 | Kumagai | 382/294 |
| 5,390,110 | 2/1995 | Cheney et al. | 128/653.1 |
| 5,442,572 | 8/1995 | Kiridena et al. | 382/276 |
| 5,465,378 | 11/1995 | Duesing et al. | 395/800 |
| 5,483,606 | 1/1996 | Denber | 382/294 |
| 5,490,221 | 2/1996 | Ransford et al. | 382/130 |
| 5,531,520 | 7/1996 | Grimson et al. | 382/294 |
| 5,568,384 | 10/1996 | Robb et al. | 364/419 |
| 5,581,638 | 12/1996 | Givens et al. | 382/294 |
| 5,615,112 | 3/1997 | Liu Sheng et al. | 395/615 |
| 5,633,951 | 5/1997 | Moshfeghi | 382/154 |
| 5,682,526 | 10/1997 | Smokoff et al. | 395/615 |
| 5,734,915 | 3/1998 | Roewer | 395/773 |
| 5,740,428 | 4/1998 | Mortimore et al. | 395/615 |

METHOD AND APPARATUS FOR IMAGE REGISTRATION

This work was supported in part by the following U.S. Government grants: NIH grants RR01380 and R01-MH52138-01A1 and ARO grant DAAL-03-86-K-0110. The U.S. Government may have certain rights in the invention.

BACKGROUND OF THE INVENTION

The present invention relates to image processing systems and methods, and more particularly to image registration systems that combine two or more images into a composite image.

Image registration involves combining two or more images, or selected points from the images, to produce a composite image containing data from each of the registered images. During registration, a transformation is computed that maps related points among the combined images so that points defining the same structure in each of the combined images are correlated in the composite image.

Currently, practitioners follow two different registration techniques. The first requires that an individual with expertise in the structure of the object represented in the images label a set of landmarks in each of the images that are to be registered. For example, when registering two MRI images of different axial slices of a human head, a physician may label points, or a contour surrounding these points, corresponding to the cerebellum in two images. The two images are then registered by relying on a known relationship among the landmarks in the two brain images.

The mathematics underlying this registration process is known as small deformation multi-target registration. In the previous example of two brain images being registered, using a purely operator-driven approach, a set of N landmarks identified by the physician, represented by $x_i$, where $i=1 \ldots N$, are defined within the two brain coordinate systems. A mapping relationship, mapping the N points selected in one image to the corresponding N points in the other image, is defined by the equation $u(x_i)=k_i$, where $i=1 \ldots N$. Each of the coefficients, $k_i$, is assumed known.

The mapping relationship u(x) is extended from the set of N landmark points to the continuum using a linear quadratic form regularization optimization of the equation:

$$u = \arg\min_u \int \|Lu\|^2 \quad (1)$$

subject to the boundary constraints $u(x_i)=k_i$. The operator L is a linear differential operator. This linear optimization problem has a closed form solution. Selecting $L=\alpha\nabla^2+\beta\nabla(\nabla\cdot)$ gives rise to small deformation elasticity. For a description of small deformation elasticity see S. Timoshenko, *Theory of Elasticity*, McGraw-Hill, 1934 and R. L. Bisplinghoff, J. W. Marr, and T. H. H. Pian, *Statistics of Deformable Solids*, Dover Publications, Inc., 1965. Selecting $L=\nabla^2$ gives rise to a membrane or Laplacian model. Others have used this operator in their work, see e.g., Amit, U. Grenander, and M. Piccioni, "Structural image restoration through deformable templates," *J. American Statistical Association.* 86(414):376–387, June 1991, and R. Szeliski, *Bayesian Modeling of Uncertainty in Low-Level Vision*, Kluwer Academic Publisher, Boston, 1989 (also describing a bi-harmonic approach). Selecting $L=\nabla^4$ gives a spline or biharmonic registration method. For examples of applications using this operator see Grace Wahba, "*Spline Models for Observational Data*," Regional Conference Series in Applied Mathematics. SIAM, 1990, and F. L. Bookstein, *The Measurement of Biological Shape and Shape Change*, volume 24, Springer-Verlag: Lecture Notes in Biomathematics, New York, 1978.

The second currently-practiced technique for image registration uses the mathematics of small deformation multi-target registration and is purely image data driven. Here, volume based imagery is generated of the two targets from which a coordinate system transformation is constructed. Using this approach, a distance measure, represented by the expression D(u), represents the distance between a template T(x) and a target image S(x) The optimization equation guiding the registration of the two images using a distance measure is:

$$u = \arg\min_u \int \|Lu\|^2 + D(u) \quad (2)$$

The distance measure D(u) measuring the disparity between imagery has various forms, e.g., the Gaussian squared error distance $\int |T(h(x))-S(x)|^2 dx$, a correlation distance, or a Kullback Liebler distance. Registration of the two images requires finding a mapping that minimizes this distance.

One limitation of the first approach to image registration is that the registration accuracy depends on the number and location of landmarks selected. Selecting too few landmarks may result in an inaccurate registration. Selecting too many landmarks does not necessarily guarantee accurate registration, but it does significantly increase the computational complexity of registration. Furthermore, it is not always possible to identify appropriate structural landmarks in all images.

The second technique is limited by the computational complexity presented by the number of data points in most images. The second technique is further limited by the fact that the process produces many local minima that confuse proper registration. This is because when registering two images according to the second technique, many possible orientations of the images produce subregions in the images that are properly matched, but the images as a whole are improperly registered.

There is, therefore, a need for a registration technique that overcomes the limitations of the conventional techniques.

SUMMARY OF THE INVENTION

The present invention overcomes the limitations of the conventional techniques by providing a methodology which combines, or fuses, some aspects of both Techniques. Specifically, the present invention uses landmark manifolds to produce a coarse registration, and subsequently incorporates image data to complete a fine registration of the template and target images.

Additional features and advantages of the invention will be set forth in the description which follows, and in part, will be apparent from the description, or may be learned by practicing the invention. The objectives and other advantages of the invention will be realized and obtained by the method and apparatus particularly pointed out in the written description and the claims hereof as well as in the appended drawings.

To achieve these and other advantages and in accordance with the purpose of the invention, as embodied and broadly described, a method according to the invention for registering a template image and a target image comprises several steps, including defining manifold landmark points in the template image and identifying points in the target image corresponding to the defined manifold landmark points. Once these points have been identified, the method includes the steps of computing a transform relating the defined manifold landmark points in the template image to corresponding points in the target image; fusing the first transform with a distance measure to determine a second transform relating all points within a region of interest in the target image to the corresponding points in the template image; and registering the template image with the target image using this second transform.

Both the foregoing general description and the following detailed description are exemplary and explanatory and are intended to provide further explanation of the invention as claimed.

DESCRIPTION OF THE FIGURES

The accompanying drawings provide a further understanding of the invention. They illustrate embodiments of the invention and, together with the description, explain the principles of the invention.

DETAILED DESCRIPTION OF THE INVENTION

A method and system is disclosed which registers images using both landmark based knowledge and image data. Reference will now be made in detail to the present preferred embodiment of the invention, examples of which are illustrated in the accompanying drawings.

Figure 1:
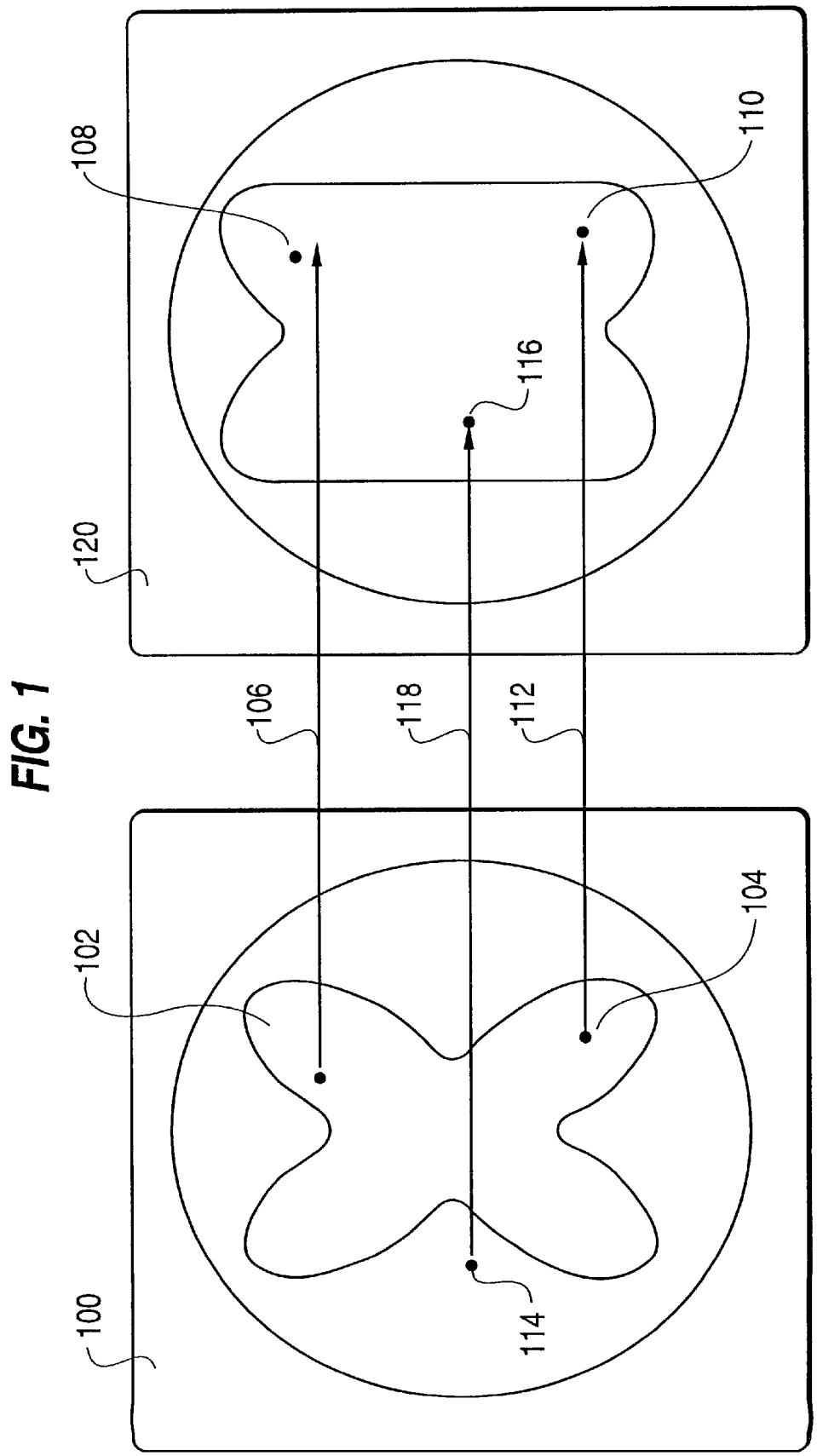
FIG. 1 is a target and template image of an axial section of a human head with 0-dimensional manifolds.

To illustrate the principles of this invention, FIG. 1 shows two axial views of a human head. In this example, template image 100 contains points 102, 104, and 114 identifying structural points (0-dimensional landmark manifolds) of interest in the template image. Target image 120 contains points 108, 110, 116, corresponding respectively to template image points 102, 104, 114, via vectors 106, 112, 118, respectively.

Figure 2:
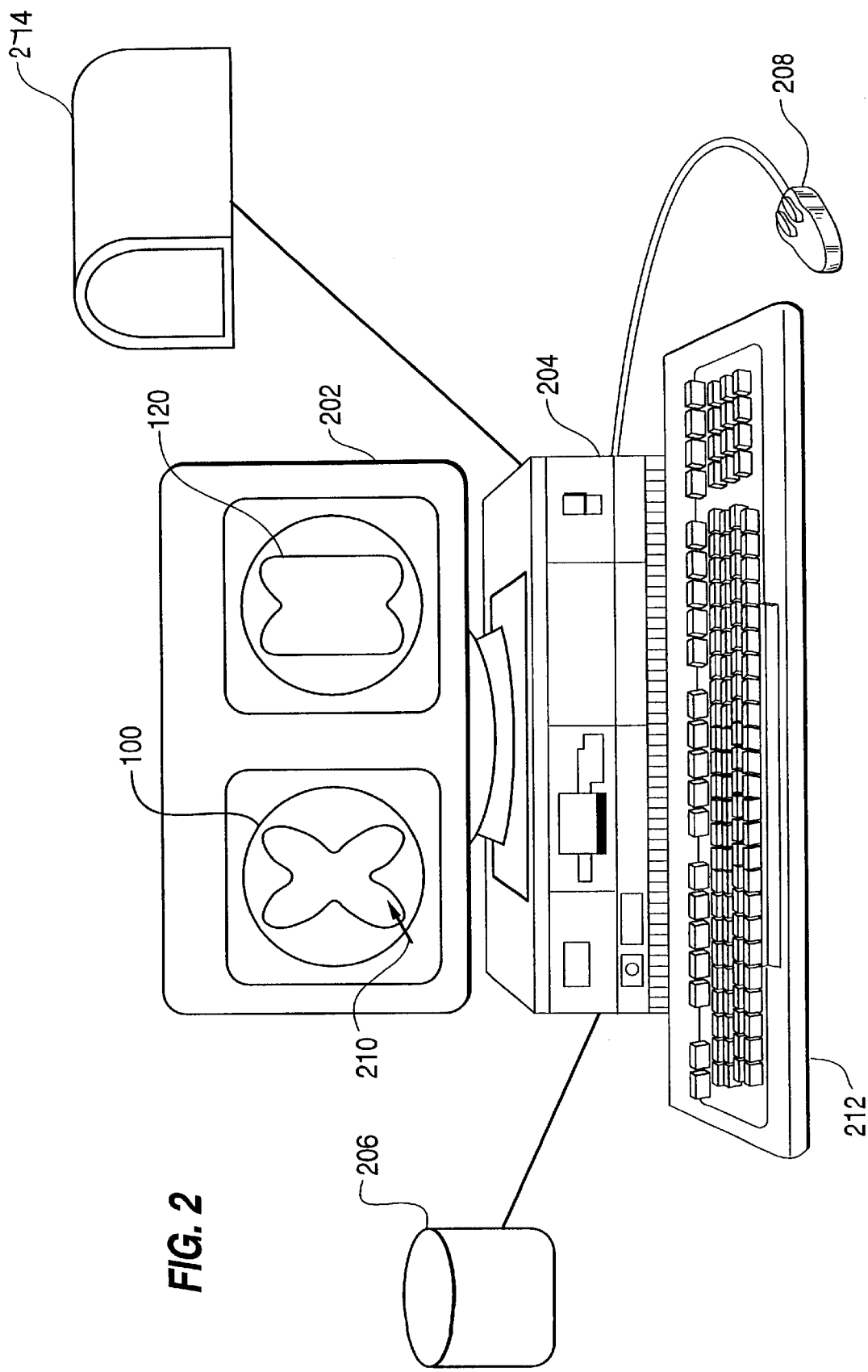
FIG. 2 is schematic diagram illustrating an apparatus for registering images in accordance with the present invention.

FIG. 2 shows apparatus to carry out the preferred embodiment of this invention. A medical imaging scanner 214 obtains the images show in FIG. 1 and stores them on a computer memory 206 which is connected to a computer central processing unit (CPU) 204. One of ordinary skill in the art will recognize that a parallel computer platform having multiple CPUs is also a suitable hardware platform for the present invention, including, but not limited to, massively parallel machines and workstations with multiple processors. Computer memory 206 can be directly connected to CPU 204, or this memory can be remotely connected through a communications network.

Registering images 100, 120 according to the present invention, unifies registration based on landmark deformations and image data transformation using a coarse-to-fine approach. In this approach, the highest dimensional transformation required during registration is computed from the solution of a sequence of lower dimensional problems driven by successive refinements. The method is based on information either provided by an operator, stored as defaults, or determined automatically about the various substructures of the template and the target, and varying degrees of knowledge about these substructures derived from anatomical imagery, acquired from modalities like CT, MRI, functional MRI, PET, ultrasound, SPECT, MEG, EEG, or cryosection.

Following this hierarchical approach, an operator, using pointing device 208, moves cursor 210 to select points 102, 104, 114 in FIG. 1, which are then displayed on a computer monitor 202 along with images 100, 120. Selected image points 102, 104, and 114 are 0-dimensional manifold landmarks.

Once the operator selects manifold landmark points 102, 104, and 114 in template image 100, the operator identifies the corresponding template image points 108, 110, 116.

Once manifold landmark selection is complete, CPU 204 computes a first transform relating the manifold landmark points in template image 100 to their corresponding image points in target image 120. Next, a second CPU 204 transform is computed by fusing the first transform relating selected manifold landmark points with a distance measure relating all image points in both template image 100 and target image 120. The operator can select an equation for the distance measure several ways including, but not limited to, selecting an equation from a list using pointing device 208, entering into CPU 204 an equation using keyboard 212, or reading a default equation from memory 206. Registration is completed by CPU 204 applying the second computed transform to all points in the template image 100.

Although several of the registration steps are described as selections made by an operator, implementation of the present invention is not limited to manual selection. For example, the transforms, boundary values, region of interest, and distance measure can be defaults read from memory or determined automatically.

Figure 3:
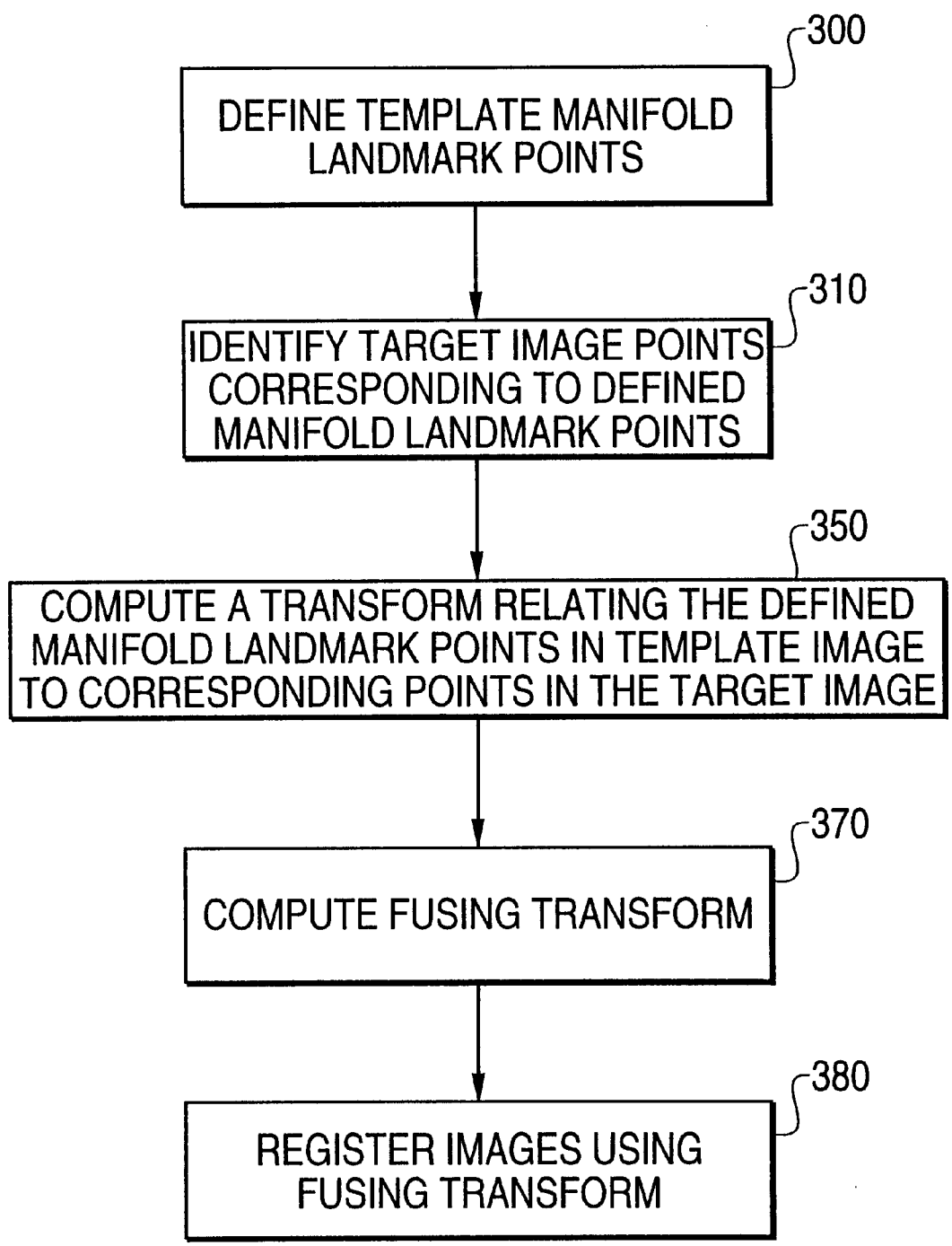
FIG. 3 is a flow diagram illustrating the method of image registration according to the present invention.

FIG. 3 illustrates the method of this invention in operation. First an operator defines a set of N manifold landmark points $x_i$, where i=1, ..., N, represented by the variable M, in the template image (step 300). These points should correspond to points that are easy to identify in the target image.

Associated with each landmark point, $x_i$, in the template image, is a corresponding point $y_i$ in the target image. The operator therefore next identifies the corresponding points, $y_i$, in the target image are identified (step 310). The nature of this process means that the corresponding points can only be identified within some degree of accuracy. This mapping between the template and target points can be specified with a resolution having a Gaussian error of variance $\sigma^2$.

If a transformation operator has not been designated, the operator can choose a manifold landmark transformation operator, L, for this transformation computation. In this embodiment, the Laplacian $$\left(\nabla = \frac{\partial^2}{\partial x_1^2} + \frac{\partial^2}{\partial x_2^2} + \frac{\partial_2}{\partial x_3^2}\right)$$

is used for the operator L. Similarly, the operator can also select boundary values for the calculation corresponding to assumed boundary conditions, if these values have not been automatically determined or stored as default values. Here, infinite boundary conditions are assumed, producing the following equation for K, where $K(x,x_i)$ is the Green's function of a manifold landmark transformation operator $L^2$ (assuming L is self-adjoint):

$$K(x, x_i) = \begin{bmatrix} \|x - x_i\| & 0 & 0 \\ 0 & \|x - x_i\| & 0 \\ 0 & 0 & \|x - x_i\| \end{bmatrix}. \quad (3)$$

Using circulant boundary conditions instead of infinite boundary conditions provides and embodiment suitable for rapid computation. One of ordinary skill in the art will recognize that other operators can be used in place of the Laplacian operator, such operators include, but are not limited to, the biharmonic operator, linear elasticity operator, and other powers of these operators.

In addition, the operator may select a region of interest in the target image. Restricting the computation to a relatively small region of interest reduces both computation and storage requirements because transformation is computed only over a subregion of interest. It is also possible that in some applications the entire image is the desired region of interest. In other applications, there may be default regions of interest that are automatically identified.

The number of computations required is proportional to the number of points in the region of interest, so the computational savings equals the ratio of the total number of points in the image to the number of points in the region of interest. The data storage savings for an image with N points with a region of interest having M points is a factor of N/M. For example, for a volume image of 256×256×256 points with a region of interest of 128×128×128 points, the computation time and the data storage are reduced by a factor of eight.

In addition, performing the computation only over the region of interest makes it necessary only to store a subregion, providing a data storage savings for the template image, the target image, and the transform values.

Following the identification of template manifold landmark points and corresponding points in the target image, as well as selection of the manifold transformation operator, the boundary values, and the region of interest, CPU 204 computes a transform that embodies the mapping relationship between these two sets of points (step 350). This transform can be estimated using Bayesian optimization, using the following equation:

$$\hat{u} = \arg\min_u \int_\Omega |Lu|^2 + \sum_{i=1}^{N} \frac{|y_i - x_i + u(x_i)|^2}{\sigma_i^2}, \quad (4)$$

the minimizer, u, having the form $$\hat{u}(x) = b + Ax + \sum_{i=1}^{N} \beta_i K(x, x_i) \quad (5)$$

where A is a 3×3 matrix, b=[$b_1$, $b_2$, $b_3$] is a 3×1 vector, [$\beta_{i1},\beta_{i2},\beta_{i3}$] is a 3×1 weighting vector.

The foregoing steps of the image registration method provide a coarse matching of a template and a target image. Fine matching of the images requires using the full image data and the landmark information and involves selecting a distance measure by solving a synthesis equation that simultaneously maps selected image landmarks in the template and target images and matches all image points within a region of interest. An example of this synthesis equation is:

$$\hat{u} = \arg\min_u \gamma \int_\Omega |T(x - u(x)) - S(x)|^2 dx + \quad (6)$$

$$\int_\Omega |Lu|^2 + \sum_{i=1}^{N} \frac{|y_i - x_i + u(x_i)|^2}{\sigma_i^2}$$

here the displacement field u is constrained to have the form $$u(x) = \sum_{k=0}^{d} \mu_k \varphi_k(x) + \sum_{i=1}^{N} \beta_i K(x, x_i) + Ax + b \quad (7)$$

with the variables $\beta_i$, A, and b, computed at step 350 in FIG. 3. The operator L in equation (6) may be the same operator used in equation (4), or alternatively, another operator may be used with a different set of boundary conditions. The basis functions φ are the eigen functions of operators such as the Laplacian Lu=$\nabla^2$u, the bi-harmonic Lu=$\nabla^4$u, linear elasticity Lu=$\alpha\nabla^2$u+$(\alpha+\beta)\nabla(\nabla.u)$, and powers of these operators $L^p$ for p≧1.

One of ordinary skill in the art will recognize that there are many possible forms of the synthesis equation. For example, in the synthesis equation presented above, the distance measure in the first term measures the relative position of points in the target image with respect to points in the template image. Although this synthesis equation uses a quadratic distance measure, one of ordinary skill in the art will recognize that there are other suitable distance measures.

CPU 204 then computes a second or fusing transformation (Step 370) using the synthesis equation relating all points within a region of interest in the target image to all corresponding points in the template image. The synthesis equation is defined so that the resulting transform incorporates, or fuses, the mapping of manifold landmarks to corresponding target image points determined when calculating the first transform.

The computation using the synthesis equation is accomplished by solving a sequence of optimization problems from coarse to fine scale via estimation of the basis coefficients $\mu_k$. This is analogous to multi-grid methods, but here the notion of refinement from coarse to fine is accomplished by increasing the number of basis components d. As the number of basis functions increases, smaller and smaller variabilities between the template and target are accommodated. The basis coefficients are determined by gradient descent, i.e., $$\mu_k^{(n+1)} = \mu_k^{(n)} - \Delta \frac{\partial H(u^{(n)} \mid S)}{\partial \mu_k} \quad (8)$$

where $$\frac{\partial H(u^{(n)})}{\partial \mu_k} = -\gamma \int_\Omega (T(x - u^{(n)}(x)) - S(x)) \nabla T(x - u^{(n)}(x)) \cdot \varphi_k(x) dx + \lambda_k^2 \mu_k^{(n)} + \left( 2 \sum_{i=1}^N \frac{y_i - x_i + u^{(n)}(x_i)}{\sigma_i^2} \right) \cdot \varphi_k(x) \quad (9)$$

and $$u^{(n)}(x) = \sum_{k=0}^d \mu_k^{(n)} \varphi_k(x) + \sum_{i=1}^N \beta_i K(x, x_i) + Ax + b \quad (10)$$

also $\Delta$ is a fixed step size and $\lambda_k$ are the eigenvalues of the eigenvectors $\phi_k$.

Figure 8:
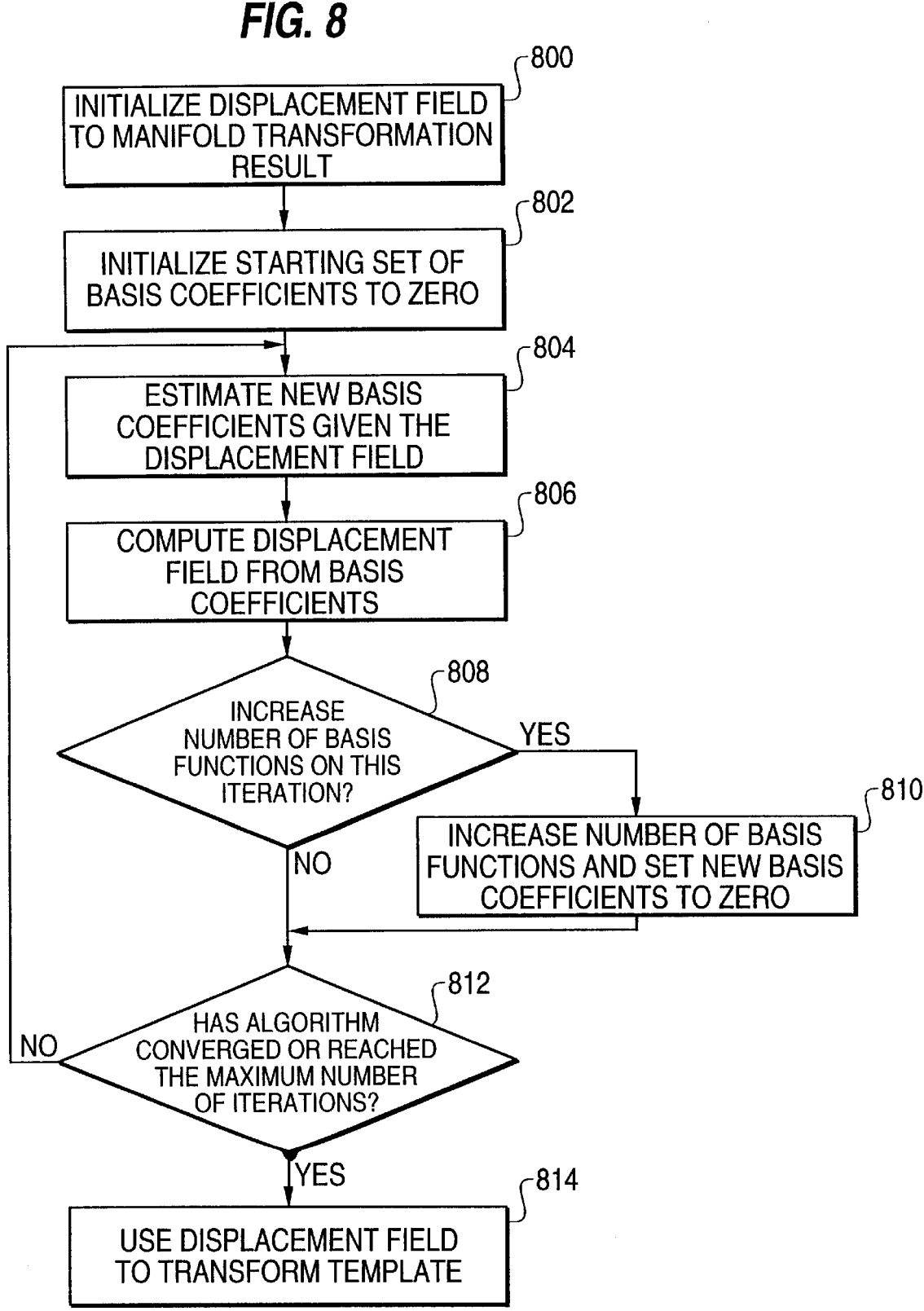
FIG. 8 is a flow diagram illustrating the computation of a fusing transform.

The computation of the fusion transformation (step 370) using the synthesis equation is presented in the flow chart of FIG. 8. Equation (7) is used to initialize the value of the displacement field $u(x)=u^{(0)}(x)$ (step 800). The basis coefficients $\mu_k = \mu_k^{(0)}$ are set equal to zero and the variables $\beta_i$, A, and b are set equal to the solution of equation (6) (step 802). Equation (8) is then used to estimate the new values of the basis coefficients $\mu_k^{(n+1)}$ given the current estimate of the displacement field $u^{(n)}(x)$ (step 804). Equation (10) is then used to compute the new estimate of the displacement field $u^{(n)}(x)$ given the current estimate of the basis coefficients $\mu_k^{(n)}$ (step 806). The next part of the computation is to decide whether or not to increase the number d of basis functions $\phi_k$ used to represent the transformation (step 808). Increasing the number of basis functions allows more deformation. Normally, the algorithm is started with a small number of basis functions corresponding to low frequency eigen functions and then on defined iterations the number of frequencies is increased by one (step 810). This coarse-to-fine strategy matches larger structures before smaller structures. The preceding computations (steps 804–810) are repeated until the computation has converged or the maximum number of iterations is reached (step 812). The final displacement field is then used to transform the template image (step 814).

Once CPU 204 determines the transform from the synthesis equation fusing both landmark manifold information and image data, CPU 204 uses this transform to register the template image with the target image (step 380).

The spectrum of the second transformation, h, is highly concentrated around zero. This means that the spectrum mostly contains low frequency components. Using the sampling theorem, the transformation can be represented by a subsampled version provided that the sampling frequency is greater than the Nyquist frequency of the transformation. The computation may be accelerated by computing the transformation on a coarse grid and extending it to the full voxel lattice e.g., in the case of 3D images, by interpolation. The computational complexity of the algorithm is proportional to the dimension of the lattice on which the transformation is computed. Therefore, the computation acceleration equals the ratio of the full voxel lattice to the coarse computational lattice.

Another way to increase the efficiency of the algorithm is to precompute the Green's functions and eigen functions of the operator L and store these precomputed valves in a lookup table. These tables replace the computation of these functions at each iteration with a table lookup. This approach exploits the symmetry of Green's functions and eigen functions of the operator L so that very little computer memory is required. In the case of the Green's functions, the radial symmetry is exploited by precomputing the Green's function only along a radial direction.

The method described for fusing landmark information with the image data transformation can be extended from landmarks that are individual points (0-dimensional manifolds) to manifolds of dimensions 1, 2 and 3 corresponding to curves (1-dimensional), surfaces (2-dimensional) and subvolumes (3-dimensional).

Figure 4:
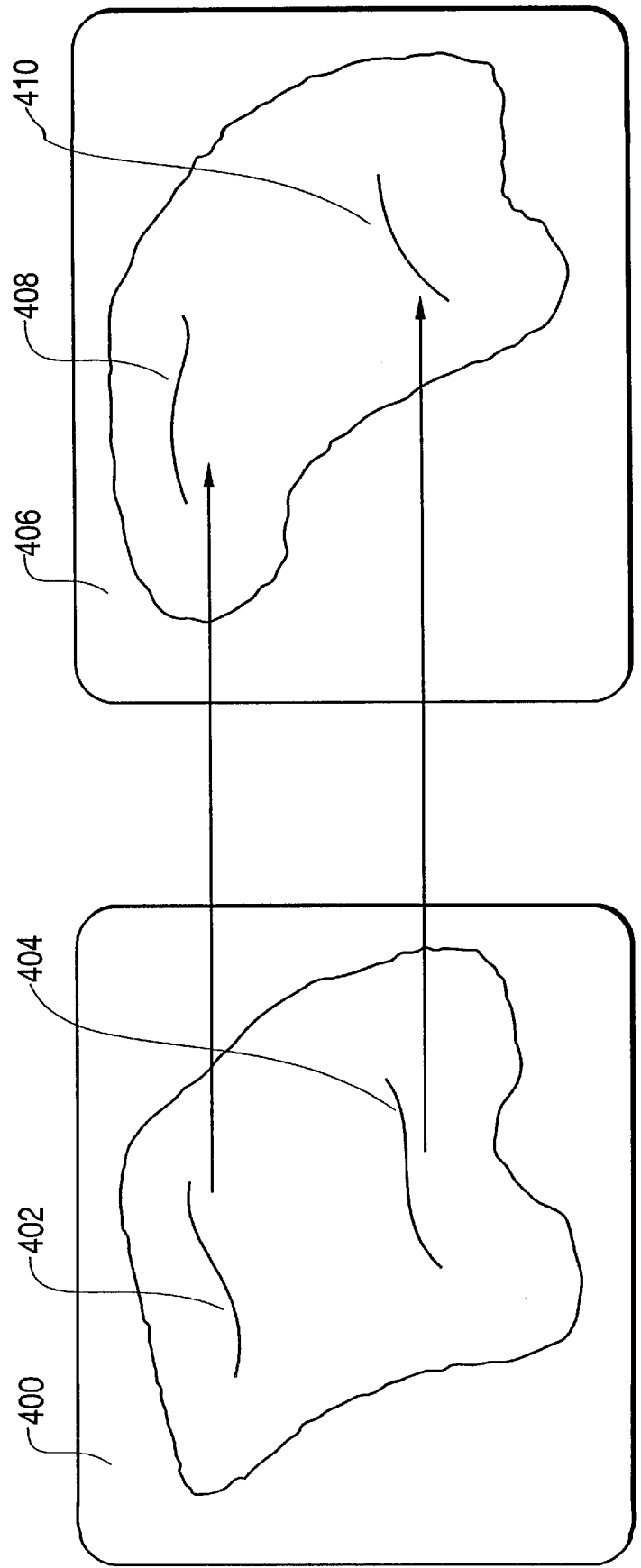
FIG. 4 is a target and a template image with 1-dimensional manifolds.
Figure 5:
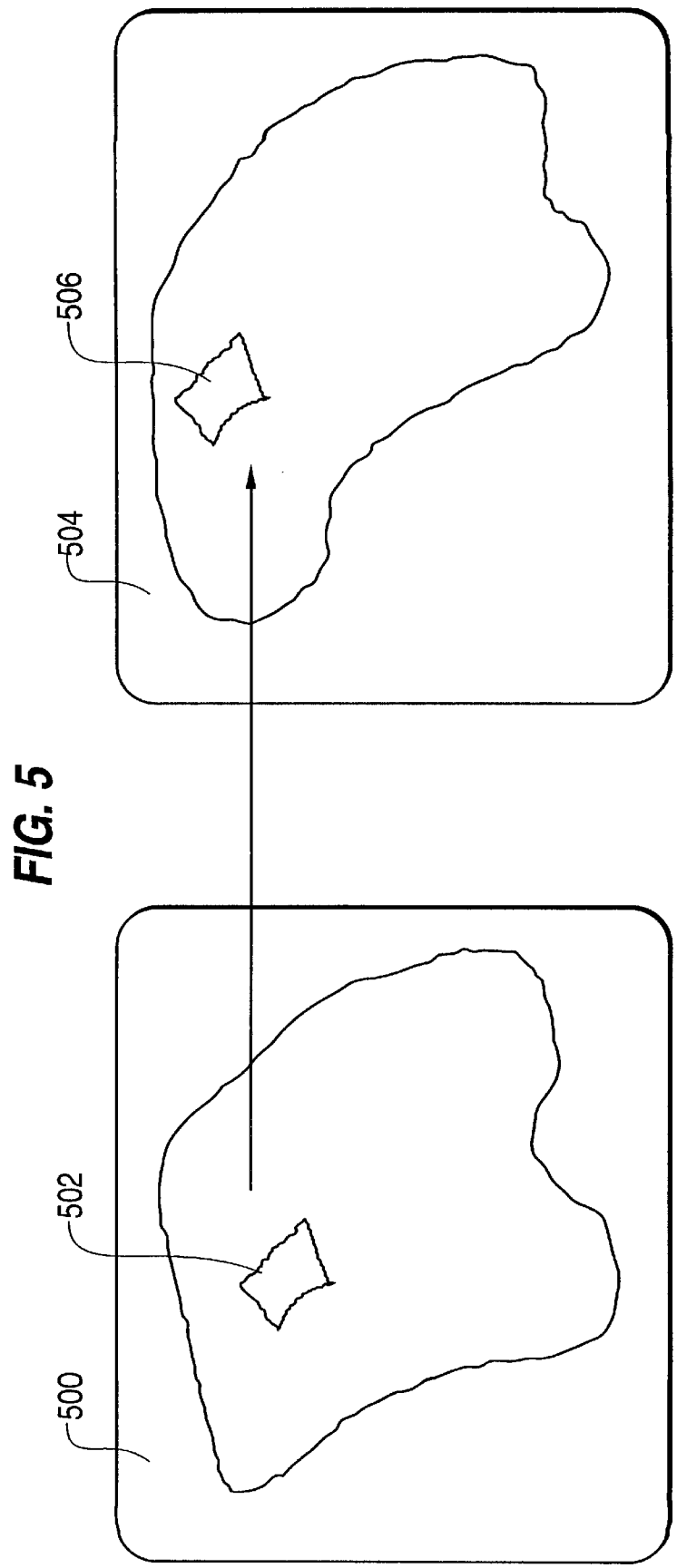
FIG. 5 is a target and a template image with 2-dimensional manifolds.
Figure 6:
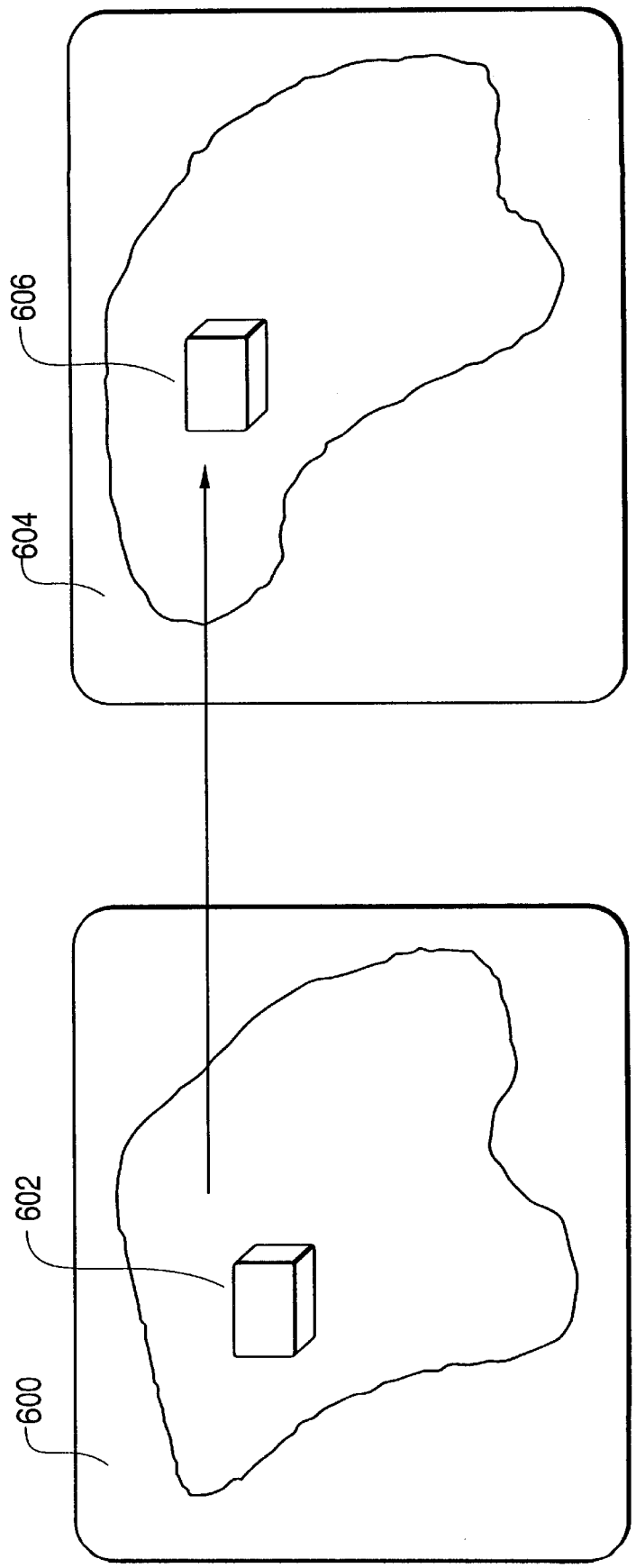
FIG. 6 is a target and a template image with 3-dimensional manifolds.

For example, FIG. 4 shows a template image 400 of a section of a brain with 1-dimensional manifolds 402 and 404 corresponding to target image 406 1-dimensional manifolds 408 and 410 respectively. FIG. 5 shows a template image 500 of a section of a brain with 2-dimensional manifold 502 corresponding to target image 504 2-dimensional manifold 506. FIG. 6 shows a template image 600 of a section of a brain with 3-dimensional manifold 602 corresponding to target image 604 3-dimensional manifold 606.

As with the point landmarks, these higher dimensional manifolds condition the transformation, that is we assume that the vector field mapping the manifolds in the template to the data is given. Under this assumption the manually-assisted deformation (step 350, FIG. 3) becomes the equality-constrained Bayesian optimization problem:

$$u(x) = \arg\min_u \int_\Omega |Lu(x)|^2 \, dx \quad (11)$$

subject to $$u(x) k(x), x \in \bigcup_{i=0}^3 M(i). \quad (12)$$

If M(I) is a smooth manifold for i=0, 1, 2, 3, the solution to this minimization is unique satisfying L†Lû(x)=0, for all template points in the selected manifold. This implies that the solution can be written in the form of a Fredholm integral equation:

$$\hat{u}(x) = \int_{\bigcup_{i=0}^3 M(i)} K(x, y) \beta(y) dS(y), \text{ where } K = GG^\dagger \quad (13)$$

and G the Green's function of L.

When the manifold is a sub-volume, M(3), dS is the Lebesgue measure on $\mathbb{R}^3$. For 2-dimensional surfaces, dS is the surface measure on M(2), For 1-dimensional manifolds (curves), dS is the line measure on M(1) and for point landmarks, M(0), dS is the atomic measure. For point landmarks, the Fredholm integral equation degenerates into a summation given by equation (5).

When the manifold of interest is a smooth, 2-dimensional surface, the solution satisfies the classical Dirichlet boundary value problem:

$$L^\dagger L \hat{u}(x) = 0, \forall x \in \Omega \setminus M \quad (14)$$

The Dirichlet problem is solved using the method of successive over relaxation as follows. If $u^k(x)$ is the estimate of a deformation field at the $k^{th}$ iteration, the estimate at the $(k+1)^{th}$ iteration is given by the following update equation:

$$u^{k+1}(x) = u^k(x) + \alpha L^{\dagger} Lu(x), \ x \in \Omega \setminus M. \quad (15)$$

$$u^{k+1}(x) = k(x), \ x \in M,$$

where α is the over relaxation factor.

It is also possible to compute the transform (step 370) with rapid convergence by solving a series of linear minimization problems where the solution to the series of linear problems converges to the solution of the nonlinear problem. This avoids needing to solve the nonlinear minimization problem directly. Using a conjugate gradient method, the computation converges faster than a direct solution of the synthesis equation because the basis coefficients $\mu_k$ are updated with optimal step sizes.

Using the conjugate gradient, the displacement field is assumed to have the form $$u(x) = \sum_{k=0}^{d} \mu_k \varphi_k(x) + f(x) \quad (16)$$

where $$f(x) = \sum_{i=1}^{N} \beta_i K(x, x_i) + Ax + b. \quad (17)$$

Begin by assuming that f(x) is fixed. This is generalized below. The eigen functions in the expansion are all real and follow the assumption that $\{\phi_i(x)\}$ are $\mathbb{R}^3$ valued.

The minimization problem is solved by computing $$\mu_j^{new} = \mu_j^{old} + \Delta_j \ j=0 \ldots d \quad (18)$$

to update the basis coefficients in equation (16) where $\mu_j=0$, j=0 . . . d initially, Δ is computed using the equation $$\Delta j = \left( \int_{\Omega} \left( \sum_{k=0}^{d} h_k(x) \right) h_j(x) dx + \lambda_j^2 + \frac{1}{\sigma^2} \sum_{i=1}^{N} \theta_{jj}(x_i) \right)^{-1} \quad (19)$$

$$\left( \int_{\Omega} (T(x - u(x)) - S(x)) \right) h_j(x) dx \sum_{i=1}^{N} \beta_i - \varphi_j(x_i) +$$

$$\frac{1}{\sigma^2} \sum_{i=1}^{N} (y_i - x_i + u(x_i)) \cdot \varphi_j(x_i) + \frac{1}{\sigma^2} \sum_{k=0}^{j-1} \Delta k \sum_{i=N}^{N} \theta_{kj}(x_i)).$$

where $h_i(x) = \nabla T|_{x-u(x)} \cdot \phi_i(x)$, and where $\theta_{ij}(x) = \phi_i(x) \cdot \phi_j(x)$. The notation $f \cdot g$ is the inner-product, i.e., $$f \cdot g = \sum_{i=1}^{3} f_i g_i \text{ for } f, g \in \mathbb{R}^3.$$

Similarly, since u(x) is written in the series expansion given in equations (16) and (17), the identical formulation for updating $\beta_i$ arises. Accordingly, the fusion achieved by the present invention results. Computation of equation (18) repeats until all $\Delta_j$ fall below a predetermined threshold solving for each $\Delta_j$ in sequence of increasing j, and $\Delta_j$ is computed using the values of $\Delta_k$ for $0 \leq k < j$.

A further improvement over prior art image registration methods is achieved by computing the required transforms using fast Fourier transforms (FFT). Implementing an FFT based computation for image registration using a synthesis equation, as required at step 370 of FIG. 3, provides computational efficiency. However, to exploit the known computational efficiencies of FFT transforms, the solution of the synthesis equation must be recast to transform the inner products required by iterative algorithms into shift invariant convolutions.

To make the inner-products required by the iterative algorithms into shift invariant convolution, differential and difference operators are defined on a periodic version of the unit cube and the discrete lattice cube. Thus, the operators are made cyclo-stationary, implying their eigen functions are always of the form of complex exponentials on these cubes having the value:

$$\Psi_k^{(r)} = \begin{bmatrix} c_{1k}^{(r)} \\ c_{2k}^{(r)} \\ c_{3k}^{(r)} \end{bmatrix} e^{j \langle \omega_k, x \rangle}. \quad (20)$$

r=1, 2, 3 with $x=(x_1,x_2,x_3) \in [0, 1]^3$, $\omega_k=(\omega_{k_1},\omega_{k_2},\omega_{k_3})$ $\omega_{ki}=2\pi k_i$, i=1, 2, 3, and the Fourier basis for periodic functions on $[0, 1]^3$ takes the form $e^{j \langle \omega_k, x \rangle}$, $\langle \omega_k, x \rangle = \omega_{k_1} x_1 + \omega_{k_2} x_2 + \omega_{k_3} x_3$. On the discrete $N^3$=periodic lattice, $$\omega_k = \left( \frac{2\pi k_1}{N}, \frac{2\pi k_2}{N}, \frac{2\pi k_3}{N} \right), x \in \{0, 1 \ldots N - 1\}^3.$$

For real expansions, the eigen vectors become $\phi_k(x) = \Psi_k(x) + \Psi_k^*(x)$ and the real expansion in equation (16) becomes:

$$u(x) = \sum_{k=0}^{d} \mu_k (\Psi_k(x) + \Psi_k^*(x)) \quad (21)$$

where * means complex conjugate.

This reformulation supports an efficient implementation of the image registration process using the FFT. Specifically, if step 370 of FIG. 3, computing the registration transform fusing landmark and image data, is implemented using the conjugate gradient method, the computation will involve a series of inner products. Using the FFT exploits the structure of the eigen functions and the computational efficiency of the FFT to compute these inner-products.

For example, one form of a synthesis equation for executing Step 370 of FIG. 3 will include the following three terms:

Term 1: $\int_{\Omega} (T(x - u(x)) - S(x)) h_j(x) dx$

Term 2: $\int_{\Omega} \left( \sum_{k=0}^{d} h_k(x) \right) h_j(x) dx$

Term 3: $u(x) = \sum_{k=0}^{d} \mu_k \varphi_k(x)$

Each of theses terms must be recast in a suitable form for FFT computation. One example of a proper reformulation for each of these terms is:

Term 1:

$$\int_\Omega (T(x-u(x)) - S(x)) \nabla T \cdot \left(\Psi_i^r(x) + \Psi_i^{(r)*}(x)\right) dx = \qquad(22)$$

$$2\text{Re}\left(\int_\Omega (T(x-u(x)) - S(x)) \left(\sum_{r=1}^3 \nabla T \cdot c_k^{(r)}\right) e^{j\langle\omega_k, x\rangle} dx\right),$$

where $c_k^{(r)}[c_{1k}^{(r)}, c_{2k}^{(r)}, c_{3k}^{(r)}]^t$. This equation is computed for all k by a Fourier transformation of the function.

$$(T(x-u(x)) - S(x))\left(\sum_{r=1}^3 \nabla T \cdot c_k^{(r)}\right) \qquad(23)$$

and hence can be computed efficiently using a 3-D FFT.

Term 2:

$$\sum_{r=1}^3 \sum_{k=0}^d \int \left(\Psi_j^{(r)} + \Psi_j^{(r)*}\right)^t (\nabla T(\nabla T)^t)\left(\Psi_j^{(r)} + \Psi_j^{(r)*}\right) dx = \qquad(24)$$

$$2\text{Re}\left(\sum_{r=1}^3 \sum_{k=0}^d (c_k^{(r)})^t \left(\int_\Omega (\nabla T(\nabla T)^t) e^{\langle\omega_k+\omega_j, x\rangle} dx\right) c_j^{(r)}\right)$$

The integral in the above summation for all k can be computed by Fourier transforming the elements of the 3×3 matrix:

$$\nabla T(\nabla T)^t \qquad(25)$$

evaluated at $\omega_k + \omega_j$. Because this matrix has diagonal symmetry, the nine FFTs in this reformulation of term 2 can be computed efficiently using six three dimensional FFTs evaluated at $\omega_k + \omega_j$.

Term 3:

Using the exact form for the eigen functions we can rewrite the above equation as $$u(x) = 2\text{Re}\left(\sum_{r=1}^3 \sum_{k=0}^d \mu_k^{(r)} \begin{bmatrix} c_{1k}^{(r)} \\ c_{2k}^{(r)} \\ c_{3k}^{(r)} \end{bmatrix} e^{j\langle\omega_k, x\rangle}\right). \qquad(26)$$

This summation is precisely the inverse Fourier transforms of the functions $$\sum_{r=1}^3 \mu_k^{(r)} c_{ik}^{(r)} \text{ for } i = 1, 2, 3$$

and hence can be computed efficiently by using 3-D inverse FFT.

One of ordinary skill in the art will recognize that restructuring the computation of registration transforms using FFTs will improve the performance of any image registration method having terms similar to those resulting from a synthesis equation fusing landmark and image data. Improvement results from the fact that many computer platforms compute FFTs efficiently; accordingly reformulating the registration process as an FFT computation, makes the required computations feasible.

A distance function used to measure the disparity between images is the Gaussian square error distance $\int |T(x-u(x))-S(x)|^2 dx$. There are many other forms of an appropriate distance measure. More generally, distance functions, such as the correlation distance, or the Kullback Liebler distance, can be written in the form $\int D(T(x-u(x)), S(x))dx$.

An efficient convolution implementation can be derived using the FFT for arbitrary distance functions. Computing the fusing transform using the image data follows the equation:

$$\hat{u} = \arg\min_u \gamma \int_\Omega D(T(x-u(x)), S(x))dx + \qquad(27)$$

$$\int_\Omega |Lu|^2 + \sum_{i=1}^N \frac{|y_i - x_i + u(x_i)|^2}{\sigma_i^2}$$

where $D(.,.)$ is a distance function relating points in the template and target images. The displacement field is assumed to have the form:

$$u(x) = \sum_{k=0}^d \mu_k \varphi_k(x) + f(x) \qquad(28)$$

where $$f(x) = b + Ax + \sum_{i=1}^N \beta_i K(x, x_i) \qquad(29)$$

is fixed. The basis coefficients $\{\mu k\}$ are determined by gradient descent, i.e., $$\mu_k^{(n+1)} = \mu_k^{(n)} - \Delta \frac{\partial H(u^{(n)} \mid S)}{\partial \mu_k} \qquad(30)$$

where the gradient is computed using the chain rule and is given by the equation $$\frac{\partial H(u^{(n)})}{\partial \mu_k} = \int_\Omega D'(T(x-u^{(n)}(x)), S(x)) \nabla T(x-u^{(n)}(x)) \cdot \varphi_k(x) dx + \qquad(31)$$

$$\lambda_k^2 \mu_k^{(n)} + \left(2 \sum_{i=1}^N \frac{y_i - x_i + u^{(n)}(x_i)}{\sigma_i^2}\right) \cdot \varphi_k(x)$$

where $D'(.,.)$ is the derivative with respect to the first argument. The most computationally intensive aspect of the algorithm is the computation of the term $$\int_\Omega D'(T(x-u^{(n)}(x)), S(x)) \nabla T(x-u^{(n)}(x)) \cdot \varphi_k(x) dx$$

Using the structure of the eigen functions and the computational efficiency of the FFT to compute these innerproducts, the above term can be written as $$2\text{Re}\int_\Omega D'(T(x-u^{(n)}(x)), S(x)) \left(\sum_{r=1}^3 \nabla T \cdot c_k^{(r)}\right) e^{j\langle\omega_k, x\rangle} dx$$

where $c_k^{(r)} = [c_{1k}^{(r)}, c_{2k}^{(r)}, c_{3k}^{(r)}]^t$. This equation is computed for all k by a Fourier transformation of the function $$D'(T(x-u^{(n)}(x)), S(x)) \left( \sum_{r=1}^{3} \nabla T \cdot c_k^{(r)} \right)$$

and hence can be computed efficiently using a 3-D FFT.

The following example illustrates the computational efficiencies achieved using FFTs for image registration instead of direct computation of inner-products. Assuming that a target image is discretized on a lattice having $N^3$ points, each of the inner-products in the algorithm, if computed directly, would have a computational complexity of the order $(N^3)^2$. Because the inner-products are computationally intensive, the overall complexity of image registration is also $(N^3)^2$. In contrast, each of the FFTs proposed has a computational complexity on the order of $N^3 \log_2 N^3$. The speed up is given by the ratio $N^6/(N^3 \log_2 N^3) = N^3/(3 \log_2 N)$. Thus the speed up is 64 times for a 16×16×16 volume and greater than $3.2 \times 10^4$ speed up for a 256×256×256 volume.

A further factor of two savings in computation time can be gained by exploiting the fact that all of the FFTs are real. Hence all of the FFTs can be computed with corresponding complex FFTs of half the number of points. For a development of the mathematics of FFTs see, A. V. Oppenheim and R. W. Schafer, *Digital Signal Processing*, Prentice-Hall, New Jersey, 1975.

Alternative embodiments of the registration method described can be achieved by changing the boundary conditions of the operator. In the disclosed embodiment, the minimization problem is formulated with cyclic boundary conditions. One of ordinary skill in the art will recognize that alternative boundary conditions, such as the Dirichlet, Neumann, or mixed Dirichlet and Neumann boundary conditions are also suitable. The following equation is used in an embodiment of the present invention using one set of mixed Dirichlet and Neumann boundary conditions:

$$\left( \frac{\partial u_i}{\partial x_i} \right)\Big|_{(x|x_i=k)} = u_i(x | x_i = k) = 0 \text{ for } i, j = 1, 2, 3; i \neq j; k = 0, 1; \quad (32)$$

where the notation $(x|x_i=k)$ means x is in the template image such that $x_i=k$. In this case, the eigen functions would be of the form:

$$\varphi_k^{(r)} = \begin{bmatrix} C_{1k}^{(r)} \cos \omega_{k1} x_1 \sin \omega_{k2} \sin \omega_{k3} x_3 \\ C_{2k}^{(r)} \sin \omega_{k1} x_1 \cos \omega_{k2} \sin \omega_{k3} x_3 \\ C_{3k}^{(r)} \sin \omega_{k1} x_1 \sin \omega_{k2} \cos \omega_{k3} x_3 \end{bmatrix} \text{ for } r = 1, 2, 3. \quad (33)$$

Modifying boundary conditions requires modifying the butterflies of the FFT from complex exponentials to appropriate sines and cosines.

Figure 7:
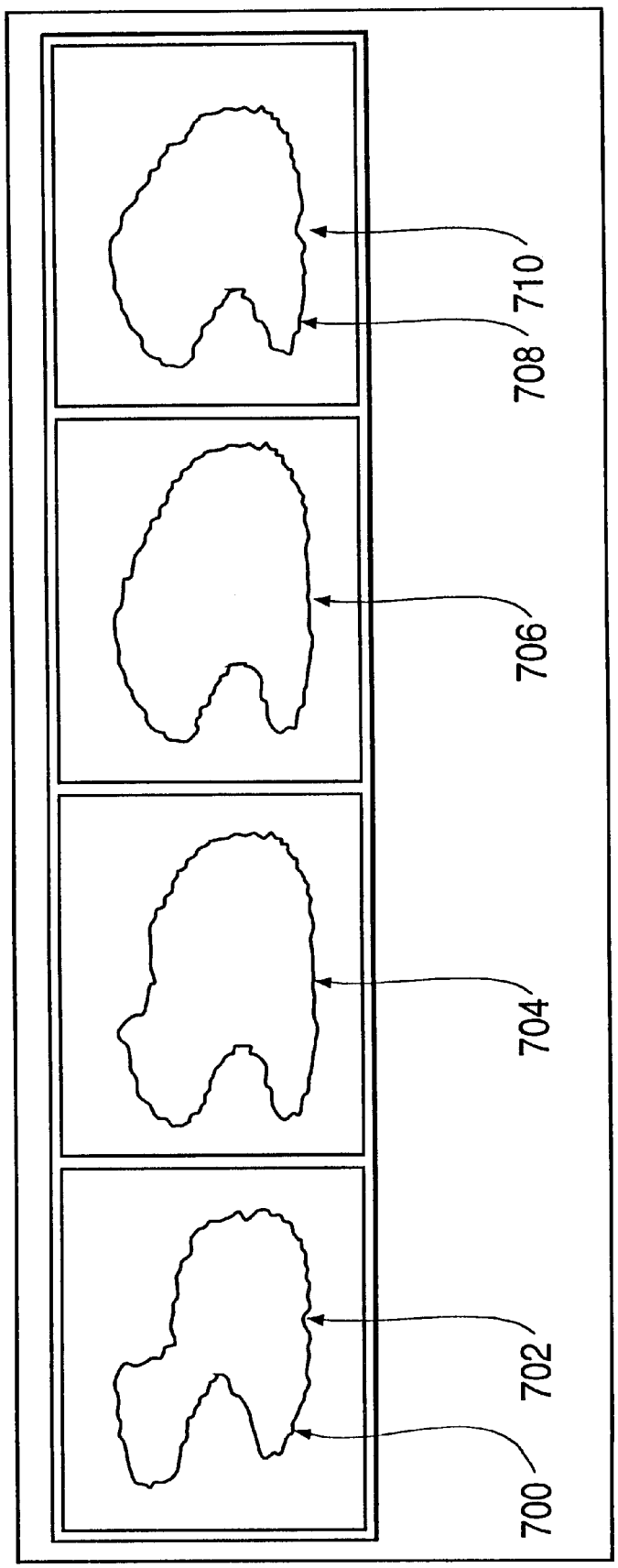
FIG. 7 is sequence of images illustrating registration of a template and target image.

In FIG. 7, four images, template image 700, image 704, image 706, and target image 708, illustrate the sequence of registering a template image and a target image. Template image 700 has 0-dimensional landmark manifolds 702. Applying the landmark manifold transform computed at step 350 in FIG. 3 to image 700 produces image 704. Applying a second transform computed using the synthesis equation combining landmark manifolds and image data to image 700 produces image 706. Image 706 is the final result of registering template image 700 with target image 708. Landmark manifold 710 in image 708 corresponds to landmark manifold 702 in template image 700.

While the disclosed system and method is useful for medical imaging systems used for noninvasive exploration of human anatomy, for example, computed tomography (CT) and magnetic resonance imaging (MRI), this invention can also be used on images acquired from other imaging modalities. Furthermore, application of the present invention is not limited to anatomical images. This invention also applies to non-anatomical images, including, but not limited to, satellite imagery, photographs, radar images, and images acquired from multiple sources.

The present invention overcame the limitation of the conventional technique by using some aspects of both techniques. Specifically, the principal advantage of the present invention is an image registration method and apparatus that fuses the techniques of registration using selected landmarks and image data. Other advantages of the invention include: 1) allowing for experts to insert knowledge directly into the imagery while at the same time allowing for the imagery itself to drive registration; 2) extending the classical framework for landmark point information (0-dimensional landmarks) used in manual assisted deformation to arbitrary manifold information in the form of 0, 1, 2, and 3 dimensional landmarks, i.e., correspondence between points (0-D) as well as lines (1-D), surfaces (2-D), and volume (3-D) dimensional anatomical coordinates; 3) a rapid convergence technique for registration using the fusion framework; and 4) an efficient FFT based convolutional implementation of the rapidly converging technique for fusion of the landmark and image information.

It will be apparent to those skilled in the art that various modifications and variations can be made to the disclosed embodiments of the present invention without departing from the spirit or scope of the invention. Thus it is intended that the present invention cover the modifications and variations of this invention provided they come within the scope of the appended claims and their equivalents.

We claim:

1. A method for registering a template image with a target image, the template image containing a plurality of points, and the target image containing a plurality of points each corresponding to a point in the template image, comprising the steps of:

defining manifold landmark points in said template image;

identifying points in said target image corresponding to said defined manifold landmark points;

computing a first transform using a manifold landmark transformation operator and manifold landmark transformation boundary values relating said manifold landmark points in said template image to said corresponding points in said target image;

fusing said first transform with a distance measure to determine a second transform relating points within a region of interest in said target image to the corresponding points in said template image; and registering said template image with said target image using said second transform.

2. The method of claim 1, wherein said step of defining manifold landmark points in said template image includes the substep of:

defining individual points in said template image.

3. The method of claim 1, wherein said step of defining manifold landmark points in said template image includes the substep of:

defining points of a curve in said template image.

4. The method of claim 1, wherein said step of defining manifold landmark points in said template image includes the substep of:

defining points of a surface in said template image.

5. The method of claim 1, wherein said step of defining manifold landmark points in said template image includes the substep of:

defining points of a volume in said template image.

6. The method of claim 1, wherein said step of computing a first transform includes the substep of:

using a linear differentiable operator.

7. The method of claim 1, wherein said step of computing a first transform includes the substep of:

using periodic boundary values.

8. The method of claim 1, wherein said step of computing a first transform includes the substep of:

using infinite boundary values.

9. The method of claim 1, wherein said step of computing a first transform includes the substep of:

using mixed Dirichlet and Neumann boundary values.

10. The method of claim 1, wherein said step of computing a first transform includes the substep of:

using Neumann boundary values.

11. The method of claim 1, wherein said step of computing a first transform includes the substep of:

using Dirichlet boundary values.

12. The method of claim 1, wherein said step of computing a first transform includes the substep of:

accessing stored pre-computed transform values.

13. The method of claim 1, wherein said step of fusing said first transform with a distance measure, determining said second transform includes the substep of:

accessing stored pre-computed transform values.

14. The method of claim 1, wherein said step of fusing said first transform with a distance measure, determining said second transform includes the substep of:

computing a fast Fourier transform.

15. The method of claim 1, wherein said step of fusing said first transform with a distance measure, determining said second transform includes the substep of:

computing a conjugate gradient.

16. An apparatus for registering a template image with a target image, the template image containing a plurality of points, and the target image containing a plurality of points each corresponding to a point in the template image, comprising:

means for defining manifold landmark points in said template image;

means for identifying points in said target image corresponding to said defined manifold landmark points;

means for computing a first transform using a manifold landmark transformation operator and manifold landmark transformation boundary values relating said manifold landmark points in said template image to said corresponding points in said target image;

means for fusing said first transform with a distance measure to determine a second transform relating points within a region of interest in said target image to the corresponding points in said template image; and means for registering said template image with said target image using said second transform.

17. The apparatus of claim 16, wherein said means for defining manifold landmark points in said template image comprises:

means for defining individual points in said template image.

18. The apparatus of claim 16, wherein said means for defining manifold landmark points in said template image comprises:

means for defining points of a curve in said template image.

19. The apparatus of claim 16, wherein said means for defining manifold landmark points in said template image comprises:

means for defining points of a surface in said template image.

20. The apparatus of claim 16, wherein said means for defining manifold landmark points in said template image comprises:

means for defining points of a volume in said template image.

21. The apparatus of claim 16, wherein said means for computing a first transform comprises:

means for using a linear differentiable operator.

22. The apparatus of claim 16, wherein said means for computing a first transform comprises:

means for using periodic boundary values.

23. The apparatus of claim 16, wherein said means for computing a first transform comprises:

means for using infinite boundary values.

24. The apparatus of claim 16, wherein said means for computing a first transform comprises:

means for using mixed Dirichlet and Neumann boundary values.

25. The apparatus of claim 16, wherein said means for computing a first transform comprises:

means for using Neumann boundary values.

26. The apparatus of claim 16, wherein said means for computing a first transform comprises:

means for using Dirichlet boundary values.

27. The apparatus of claim 16, wherein said means for computing a first transform comprises:

means for accessing stored pre-computed transform values.

28. The apparatus of claim 16, wherein said means for fusing said first transform with a distance measure to determine said second transform comprises:

means for accessing stored pre-computed transform values.

29. The apparatus of claim 16, wherein said means for fusing said first transform with a distance measure to determine said second transform comprises:

means for computing a fast Fourier transform.

30. The apparatus of claim 16, wherein said means for fusing said first transform with a distance measure to determine said second transform comprises:

means for computing a conjugate gradient.

31. A method for registering a template medical image with a target medical image, the template medical image containing a plurality of points, and the target medical image containing a plurality of points each corresponding to a point in the template medical image, comprising the steps of:

defining manifold landmark points identifying anatomical structure in said template medical image;

identifying points in said target medical image corresponding to said defined manifold landmark points;

computing a first transform using a manifold landmark transformation operator and manifold landmark transformation boundary values relating said manifold landmark points in said template medical image to said corresponding points in said target medical image;

fusing said first transform with a distance measure to determine a second transform relating points within a region of interest in said target medical image to the corresponding points in said template medical image; and registering said template medical image with said target medical image using said second transform.

32. The method of claim 31, wherein said step of defining manifold landmark points in said template medical image includes the substep of:

defining individual points in said template medical image.

33. The method of claim 31, wherein said step of defining manifold landmark points in said template medical image includes the substep of:

defining points of a curve in said template medical image.

34. The method of claim 31, wherein said step of defining manifold landmark points in said template medical image includes the substep of:

defining points of a surface in said template medical image.

35. The method of claim 31, wherein said step of defining manifold landmark points in said template medical image includes the substep of:

defining points of a volume in said template medical image.

36. The method of claim 31, wherein said step of computing a first transform includes the substep of:

using a linear differentiable operator.

37. The method of claim 31, wherein said step of computing a first transform includes the substep of:

using periodic boundary values.

38. The method of claim 31, wherein said step of computing a first transform includes the substep of:

using infinite boundary values.

39. The method of claim 31, wherein said step of computing a first transform includes the substep of:

using mixed Dirichlet and Neumann boundary values.

40. The method of claim 31, wherein said step of computing a first transform includes the substep of:

using Neumann boundary values.

41. The method of claim 31, wherein said step of computing a first transform includes the substep of:

using Dirichlet boundary values.

42. The method of claim 31, wherein said step of computing a first transform includes the substep of:

accessing stored pre-computed transform values.

43. The method of claim 31, wherein said step of fusing said first transform with a distance measure, determining said second transform includes the substep of:

accessing stored pre-computed transform values.

44. The method of claim 31, wherein said step of fusing said first transform with a distance measure, determining said second transform includes the substep of:

computing a fast Fourier transform.

45. The method of claim 31, wherein said step of fusing said first transform with a distance measure, determining said second transform includes the substep of:

computing a conjugate gradient.

46. An apparatus for registering a template medical image with a target medical image, the template medical image containing a plurality of points, and the target medical image containing a plurality of points each corresponding to a point in the template medical image, comprising:

means for defining manifold landmark points identifying anatomical structure in said template medical image;

means for identifying points in said target medical image corresponding to said defined manifold landmark points;

means for computing a first transform using a manifold landmark transformation operator and manifold landmark transformation boundary values relating said manifold landmark points in said template medical image to said corresponding points in said target medical image;

means for fusing said first transform with a distance measure to determine a second transform relating points within a region of interest in said target medical image to the corresponding points in said template medical image; and means for registering said template medical image with said target medical image using said second transform.

47. The apparatus of claim 46, wherein said means for defining manifold landmark points in said template medical image comprises:

means for defining individual points in said template medical image.

48. The apparatus of claim 46, wherein said means for defining manifold landmark points in said template medical image comprises:

means for defining points of a curve in said template medical image.

49. The apparatus of claim 46, wherein said means for defining manifold landmark points in said template medical image comprises:

means for defining points of a surface in said template medical image.

50. The apparatus of claim 46, wherein said means for defining manifold landmark points in said template medical image comprises:

means for defining points of a volume in said template medical image.

51. The apparatus of claim 46, wherein said means for computing a first transform comprises:

means for using a linear differentiable operator.

52. The apparatus of claim 46, wherein said means for computing a first transform comprises:

means for using periodic boundary values.

53. The apparatus of claim 46, wherein said means for computing a first transform comprises:

means for using infinite boundary values.

54. The apparatus of claim 46, wherein said means for computing a first transform comprises:

means for using mixed Dirichlet and Neumann boundary values.

55. The apparatus of claim 46, wherein said means for computing a first transform comprises:

means for using Neumann boundary values.

56. The apparatus of claim 46, wherein said means for computing a first transform comprises:

means for using Dirichlet boundary values.

57. The apparatus of claim 46, wherein said means for computing a first transform comprises:

means for accessing stored pre-computed transform values.

58. The apparatus of claim 46, wherein said means for fusing said first transform with a distance measure to determine said second transform comprises:

means for accessing stored pre-computed transform values.

59. The apparatus of claim 46, wherein said means for fusing said first transform with a distance measure to determine said second transform comprises:

means for computing a fast Fourier transform.

60. The apparatus of claim 46, wherein said means for fusing said first transform with a distance measure to determine said second transform comprises:

means for computing a conjugate gradient.

61. A method for registering a template image with a target image, the template image containing a plurality of points, and the target image containing a plurality of points each corresponding to a point in the template image, comprising the steps of:

defining manifold landmark points in said template image;

identifying points in said target image corresponding to said defined manifold landmark points;

computing a registration transform using a fast Fourier transform, a manifold landmark transformation operator, and manifold landmark transformation boundary values relating said manifold landmark points in said template image to said corresponding points in said target image; and registering said template image with said target image using said registration transform.

62. A method for registering a template image with a target image, the template image containing a plurality of points, and the target image containing a plurality of points each corresponding to a point in the template image, comprising the steps of:

computing a registration transform using a fast Fourier transform from a distance measure describing a relative position of all points within a region of interest in said target image to the corresponding points in said template image; and registering said template image with said target image using said registration transform.

63. A method for registering a template medical image with a target medical image, the template medical image containing a plurality of points, and the target medical image containing a plurality of points each corresponding to a point in the template medical image, comprising the steps of:

defining manifold landmark points in said template medical image;

identifying points in said target medical image corresponding to said defined manifold landmark points;

computing a registration transform using a fast Fourier transform, a manifold landmark transformation operator, and manifold landmark transformation boundary values relating said manifold landmark points in said template medical image to said corresponding points in said target medical image; and registering said template medical image with said target medical image using said registration transform.

64. A method for registering a template medical image with a target medical image, the template medical image containing a plurality of points, and the target medical image containing a plurality of points each corresponding to a point in the template medical image, comprising the steps of:

computing a registration transform using a fast Fourier transform from a distance measure describing a relative position of all points within a region of interest in said target medical image to the corresponding points in said template medical image; and registering said template medical image with said target medical image using said registration transform.

65. A method for registering a template image with a target image, the template image containing a plurality of points, and the target image containing a plurality of points each corresponding to a point in the template image, comprising the steps of:

defining manifold landmark points of dimension greater than zero in said template image;

identifying points in said target image corresponding to said defined manifold landmark points;

computing a transform using a manifold landmark transformation operator and manifold landmark transformation boundary values relating said manifold landmark points in said template image to said corresponding points in said target image; and registering said template image with said target image using said transform.

66. The method of claim 65, wherein said step of defining manifold landmark points in said template image includes the substep of:

defining points of a curve in said template image.

67. The method of claim 65, wherein said step of defining manifold landmark points in said template image includes the substep of:

defining points of a surface in said template image.

68. The method of claim 65, wherein said step of defining manifold landmark points in said template image includes the substep of:

defining points of a volume in said template image.

69. The method of claim 65, wherein said step of computing a transform includes the substep of:

using a linear differentiable operator.

70. The method of claim 65, wherein said step of computing a transform includes the substep of:

using periodic boundary values.

71. The method of claim 65, wherein said step of computing a transform includes the substep of:

using infinite boundary values.

72. The method of claim 65, wherein said step of computing a transform includes the substep of:

using mixed Dirichlet and Neumann boundary values.

73. The method of claim 65, wherein said step of computing a transform includes the substep of:

using Neumann boundary values.

74. The method of claim 65, wherein said step of computing a transform includes the substep of:

using Dirichlet boundary values.

75. The method of claim 65, wherein said step of computing a transform includes the substep of:

accessing stored pre-computed transform values.

76. An apparatus for registering a template image with a target image, the template image containing a plurality of points, and the target image containing a plurality of points each corresponding to a point in the template image, comprising:

means for defining manifold landmark points of dimension greater than zero in said template image;

means for identifying points in said target image corresponding to said defined manifold landmark points;

means for computing a transform using a manifold landmark transformation operator and manifold landmark transformation boundary values relating said manifold landmark points in said template image to said corresponding points in said target image; and means for registering said template image with said target image using said transform.

77. The apparatus of claim 76, wherein said means for defining manifold landmark points in said template image comprises:

means for defining points of a curve in said template image.

78. The apparatus of claim 76, wherein said means for defining manifold landmark points in said template image comprises:
means for defining points of a surface in said template image.

79. The apparatus of claim 76, wherein said means for defining manifold landmark points in said template image comprises:
means for defining points of a volume in said template image.

80. The apparatus of claim 76, wherein said means for computing a transform comprises:
means for using a linear differentiable operator.

81. The apparatus of claim 76, wherein said means for computing a transform comprises:
means for using periodic boundary values.

82. The apparatus of claim 76, wherein said means for computing a transform comprises:
means for using infinite boundary values.

83. The apparatus of claim 76, wherein said means for computing a transform comprises:
means for using mixed Dirichlet and Neumann boundary values.

84. The apparatus of claim 76, wherein said means for computing a transform comprises:
means for using Neumann boundary values.

85. The apparatus of claim 76, wherein said means for computing a transform comprises:
means for using Dirichlet boundary values.

86. The apparatus of claim 76, wherein said means for computing a transform comprises:
means for accessing stored pre-computed transform values.

87. A method for registering a template medical image with a target medical image, the template medical image containing a plurality of points, and the target medical image containing a plurality of points each corresponding to a point in the template medical image, comprising the steps of:
defining manifold landmark points of dimension greater than zero identifying anatomical structure in said template medical image;
identifying points in said target medical image corresponding to said defined manifold landmark points;
computing a transform using a manifold landmark transformation operator and manifold landmark transformation boundary values relating said manifold landmark points in said template medical image to said corresponding points in said target medical image; and
registering said template medical image with said target medical image using said transform.

88. The method of claim 87, wherein said step of defining manifold landmark points in said template medical image includes the substep of:
defining points of a curve in said template medical image.

89. The method of claim 87, wherein said step of defining manifold landmark points in said template medical image includes the substep of:
defining points of a surface in said template medical image.

90. The method of claim 87, wherein said step of defining manifold landmark points in said template medical image includes the substep of:
defining points of a volume in said template medical image.

91. The method of claim 87, wherein said step of computing a transform includes the substep of:
using a linear differentiable operator.

92. The method of claim 87, wherein said step of computing a transform includes the substep of:
using periodic boundary values.

93. The method of claim 87, wherein said step of computing a transform includes the substep of:
using infinite boundary values.

94. The method of claim 87, wherein said step of computing a transform includes the substep of:
using mixed Dirichlet and Neumann boundary values.

95. The method of claim 87, wherein said step of computing a transform includes the substep of:
using Neumann boundary values.

96. The method of claim 87, wherein said step of computing a transform includes the substep of:
using Dirichlet boundary values.

97. The method of claim 87, wherein said step of computing a transform includes the substep of:
accessing stored pre-computed transform values.

98. An apparatus for registering a template medical image with a target medical image, the template medical image containing a plurality of points, and the target medical image containing a plurality of points each corresponding to a point in the template medical image, comprising:
means for defining manifold landmark points of dimension greater than zero identifying anatomical structure in said template medical image;
means for identifying points in said target medical image corresponding to said defined manifold landmark points;
means for computing a transform using a manifold landmark transformation operator and manifold landmark transformation boundary values relating said manifold landmark points in said template medical image to said corresponding points in said target medical image; and
means for registering said template medical image with said target medical image using said transform.

99. The apparatus of claim 98, wherein said means for defining manifold landmark points in said template medical image comprises:
means for defining points of a curve in said template medical image.

100. The apparatus of claim 98, wherein said means for defining manifold landmark points in said template medical image comprises:
means for defining points of a surface in said template medical image.

101. The apparatus of claim 98, wherein said means for defining manifold landmark points in said template medical image comprises:
means for defining points of a volume in said template medical image.

102. The apparatus of claim 98, wherein said means for computing a transform comprises:
means for using a linear differentiable operator.

103. The apparatus of claim 98, wherein said means for computing a transform comprises:
means for using periodic boundary values.

104. The apparatus of claim 98, wherein said means for computing a transform comprises:

means for using infinite boundary values.

105. The apparatus of claim 98, wherein said means for computing a transform comprises:

means for using mixed Dirichlet and Neumann boundary values.

106. The apparatus of claim 98, wherein said means for computing a transform comprises:

means for using Neumann boundary values.

107. The apparatus of claim 98, wherein said means for computing a transform comprises:

means for using Dirichlet boundary values.

108. The apparatus of claim 98, wherein said means for computing a transform comprises:

means for accessing stored pre-computed transform values.

109. A method for registering a template image with a target image, the template image containing a plurality of points, and the target image containing a plurality of points each corresponding to a point in the template image, comprising the steps of:

defining manifold landmark points in said template image;

identifying points in said target image corresponding to said defined manifold landmark points;

computing a first transform using a manifold landmark transformation operator and manifold landmark transformation boundary values relating said manifold landmark points in said template image to said corresponding points in said target image;

fusing said first transform with a distance measure to determine a higher order second transform relating points within a region of interest in said target image to the corresponding points in said template image; and registering said template image with said target image using said second transform.

110. A method for registering an n-dimensional template image with an n-dimensional target image, the template image containing a plurality of points, and the target image containing a plurality of points each corresponding to a point in the template image, comprising the steps of:

defining manifold landmark points in said template image;

identifying points in said target image corresponding to said defined manifold landmark points;

computing a first transform using a manifold landmark transformation operator and manifold landmark transformation boundary values relating said manifold landmark points in said template image to said corresponding points in said target image;

fusing said first transform with a distance measure to determine a second transform having more than $n^2+n$ degrees of freedom, relating points within a region of interest in said target image to the corresponding points in said template image; and registering said template image with said target image using said second transform.

111. A method for registering a template image with a target image, the template image containing a plurality of points, and the target image containing a plurality of points each corresponding to a point in the template image, comprising the steps of:

defining manifold landmark points in said template image;

identifying points in said target image corresponding to said defined manifold landmark points;

computing a first transform using a manifold landmark transformation operator and manifold landmark transformation boundary values relating said manifold landmark points in said template image to said corresponding points in said target image;

fusing said first transform with a distance measure to determine a second transform having a number of degrees of freedom that is greater than the number of degrees of freedom in an affine transform, relating points within a region of interest in said target image to the corresponding points in said template image; and registering said template image with said target image using said second transform.

112. A method for registering a template image with a target image, the template image containing a plurality of points, and the target image containing a plurality of points each corresponding to a point in the template image, comprising the steps of:

defining manifold landmark points in said template image;

identifying points in said target image corresponding to said manifold landmark points; and registering said template image with said target image using said manifold landmark points using a transform having the form:

$$= \arg\min_u \gamma \int_\Omega |T(x - u(x)) - S(x)|^2 dx + \int_\Omega |Lu|^2 + \sum_{i=1}^{N} \frac{|y_i - x_i + u(x_i)|}{\sigma_i^2}$$

where the displacement field u has the form:

$$u(x) = \sum_{k=0}^{d} \mu_k \varphi_k(x) + \sum_{i=1}^{N} \beta_i K(x, x_i) + Ax + b$$

where L is a transformation operator, N is the number of manifold landmark points, $x_i$ is the i-th manifold landmark point in said target image, $y_i$ is a manifold landmark point in said template image corresponding to $x_i$, x represents a pixel position in said template image or said target image, K is the Green's function of the transformation operator, β is a weighting vector, T(x) is said template image, S(x) is said target image, φ is a basis function of the transformation operator, $\mu$ is a basis coefficient, d is the number of basis functions, A is a matrix, b is a vector, γ is a first scale factor, σ is a second scale factor, and Ω is a region of said target image.

113. A method for registering a template image with a target image, the template image containing a plurality of points, and the target image containing a plurality of points each corresponding to a point in the template image, comprising the steps of:

define manifold landmark points in said template image;

identify points in said target image corresponding to said defined manifold points; and registering said template image with said target image using said defined manifold landmark points using a transform having the form:

$$\hat{u} = \arg\min_{u} \gamma D_1(T(x - u(x)), S(x)) + \lambda \sum_{i=1}^{N} D_2(y_i, x_i - u(x_i)) + p(u)$$

where $D_1$ is a first distance measure between a transformed template image and said target image, $D_2$ is a second distance measure between said defined manifold landmark points in said target image and said transformed template image, p(u) is a regularization energy, N is the number of defined manifold landmark points, $x_i$ is the i-th manifold landmark point in said target image, $y_i$ is a manifold landmark point in said template image corresponding to $x_i$, x represents a pixel position in said target image, T(x) is the template image, S(x) is the target image, $\gamma$ is a first scale factor, and $\lambda$ is a second scale factor.

114. A method for automatically registering a template image with a target image, the template image containing a plurality of points, and the target image containing a plurality of points each corresponding to a different point in the template image, comprising the steps of:

defining manifold landmark points in said template image;

identifying points in said target image corresponding to said defined manifold landmark points;

computing a first transform using a manifold landmark transformation operator and manifold landmark transformation boundary values relating said manifold landmark points in said template image to said corresponding points in said target image;

fusing said first transform with a distance measure to determine a second transform relating all points within a region of interest in said target image to the corresponding points in said template image; and registering said template image with said target image using said second transform.

115. An apparatus for automatically registering a template image with a target image, the template image containing a plurality of points, and the target image containing a plurality of points each corresponding to a different point in the template image, comprising:

means for defining manifold landmark points in said template image;

means for identifying points in said target image corresponding to said defined manifold landmark points;

means for computing a first transform using a manifold landmark transformation operator and manifold landmark transformation boundary values relating said manifold landmark points in said template image to said corresponding points in said target image;

means for fusing said first transform with a distance measure to determine a second transform relating all points within a region of interest in said target image to the corresponding points in said template image; and means for registering said template image with said target image using said second transform.

* * * * *

UNITED STATES PATENT AND TRADEMARK OFFICE
CERTIFICATE OF CORRECTION

PATENT NO. : 6,009,212
DATED : December 28, 1999
INVENTOR(S) : Michael I. Miller et al.

It is certified that error appears in the above-identified patent and that said Letters Patent is hereby corrected as shown below:

Claims,
Column 24, claim 112,
Line 50, "ϕ" should read --φ--.

Column 24, claim 113,
Line 61, "define" should read -- defining --;
Line 62, "identify" should read -- identifying --.

References Cited
U.S. PATENT DOCUMENTS

| Patent No. | Date | Inventor | Class |
|---|---|---|---|
| -- 5,222,499 | 06/29/93 | Allen et al. | |
| 4,701,049 | 10/87 | Beckman | 356/1 |
| 4,791,934 | 12/20/88 | Brunnett | 606/130 |
| 4,821,200 | 04/11/89 | Oberg | 364/474.24 |
| 4,836,778 | 06/06/89 | Baumrind et al. | 433/69 |
| 4,945,914 | 08/90 | Allen | 128/653R |
| 4,991,579 | 02/91 | Allen | 128/653R |
| 5,016,639 | 05/91 | Allen | 128/653R |
| 5,094,241 | 03/92 | Allen | 128/653.1 |
| 5,119,817 | 06/92 | Allen | 128/653.1 |
| 5,142,930 | 09/92 | Allen et al. | 74/469 |
| 5,178,164 | 01/93 | Allen | 128/898 |
| 5,197,476 | 03/93 | Nowacki et al. | 128/66003 |
| 4,583,538 | 04/86 | Onic et al. | 606/130 |
| 4,673,352 | 6/16/87 | Hansen | 433/69 |
| 4,737,921 | 4/12/88 | Goldwasser et al. | 345/421 |
| 4,896,673 | 1/30/90 | Rose et al. | 600/439 |
| 5,039,867 | 8/13/91 | Nishihara et al. | 250/492.3 |
| 5,050,608 | 9/24/91 | Watanabe et al. | 600/429 |
| 5,078,140 | 1/7/92 | Kwoh | 600/417 |
| 5,079,699 | 1/7/92 | Tuy et al. | 345/424 |
| 5,086,401 | 2/4/92 | Glassman, et al. | 395/94 |
| 5,186,174 | 2/16/93 | Schlondorff et al. | 600/426 |
| 5,198,877 | 3/30/93 | Schulz | 356/375 |
| 5,207,223 | 5/4/93 | Adler | 600/427 |

UNITED STATES PATENT AND TRADEMARK OFFICE
CERTIFICATE OF CORRECTION

PATENT NO.   : 6,009,212
DATED        : December 28, 1999
INVENTOR(S)  : Michael I. Miller et al.

It is certified that error appears in the above-identified patent and that said Letters Patent is hereby corrected as shown below:

| | | | |
|---|---|---|---|
| 5,230,338 | 7/27/93 | Allen et al. | 600/429 |
| 5,249,581 | 10/5/93 | Horbal et al. | 600/407 |
| 5,251,127 | 10/5/93 | Raab | 606/130 |
| 5,257,998 | 11/2/93 | Ota et al. | 606/130 |
| 5,291,889 | 3/8/94 | Kenet et al. | 600/425 |
| 5,295,200 | 3/15/94 | Boyer | 600/439 |
| 5,295,483 | 3/22/94 | Nowacki et al. | 395/80 |
| 5,299,288 | 3/29/94 | Glassman et al. | 606/1 |
| 5,305,203 | 4/19/94 | Raab | 600/429 |
| 5,309,913 | 5/10/94 | Kormos et al. | 356/375 |
| 5,359,417 | 10/25/94 | Muller et al. | 378/4 |
| 5,371,778 | 12/6/94 | Yanof et al. | 606/130 |
| 5,389,101 | 2/14/95 | Heilbrum et al. | 600/130 |
| 5,398,684 | 3/21/95 | Hardy | 600/391 |
| 5,447,154 | 9/5/95 | Cinquin et al. | 600/429 |
| 5,494,034 | 2/27/96 | Schlondorff et al. | 600/425 |
| 5,515,160 | 5/7/96 | Schulz et al. | 356/241 |
| 5,517,990 | 5/21/96 | Kalfas et al. | 600/414 |
| 5,526,576 | 6/18/96 | Fuchs et al. | 33/503 |
| B1 5,383,454 | 12/31/96 | Bucholz (re-exam) | 600/429 |
| 5,603,318 | 2/18/97 | Heilbrum et al. | 600/426 |
| 5,617,857 | 4/8/97 | Chader et al. | 600/424 |
| 5,622,170 | 4/22/97 | Schulz | 600/476 |
| 5,647,361 | 07/15/97 | Damadian | 600/411 |
| 4,262,306 | 04/14/81 | Renner | 348/77 |
| 4,608,977 | 09/02/86 | Brown | 606/130 |
| 4,896,673 | 01/30/90 | Rose et al. | 600/439 |
| 5,638,819 | 06/17/97 | Manwaring et al. | 600/424 |
| 5,662,111 | 09/02/97 | Cosman | 600/417 |
| 5,682,886 | 11/04/97 | Delp et al. | 600/407 |
| 5,531,227 | 7/2/96 | Schneider | 128/653.1 |
| 5,099,846 | 3/31/92 | Hardy | 128/653.1 |
| 5,383,454 | 1/24/95 | Bucholz | 128/653.1 |

UNITED STATES PATENT AND TRADEMARK OFFICE
CERTIFICATE OF CORRECTION

PATENT NO. : 6,009,212
DATED : December 28, 1999
INVENTOR(S) : Michael I. Miller et al.

It is certified that error appears in the above-identified patent and that said Letters Patent is hereby corrected as shown below:

| | | | |
|---|---|---|---|
| 4,722,056 | 1/26/88 | Roberts, et al. | 606/130 |
| 5,463,721 | 10/31/95 | Tam | 395/127 |
| 4,821,213 | 04/11/89 | Cline et al. | 395/124 |
| 5,452,416 | 09/19/95 | Hilton | 395/346 |
| 5,442,733 | 08/15/95 | Kaufman et al. | 395/124 |
| 5,402,337 | 03/28/95 | Nishide | 395/126 |
| 5,412,763 | 05/02/95 | Knoplioch et al. | 395/124 |
| 5,383,119 | 01/17/95 | Tam | 378/8 |
| 5,353,220 | 10/06/94 | Ito et al. | 128/660.02 |
| 5,351,697 | 10/04/94 | Cheney et al. | 128/734 |
| 5,331,553 | 07/19/94 | Muehllehner et al. | 250/363.02 |
| 5,309,356 | 05/03/94 | Nishide et al. | 382/131 |
| 5,284,142 | 02/08/94 | Gobel et al. | 128/734 |
| 5,229,935 | 07/20/93 | Yamagishi et al. | 128/653.1 |
| 5,166,875 | 11/24/92 | Machida | 128/653.2 |
| 4,835,688 | 05/30/89 | Kimura | 395/124 |
| 5,261,404 | 11/16/93 | Mick et al. | 128/653.1 |
| 4,879,668 | 11/07/89 | Cline et al. | 395/124 -- |

FOREIGN PATENT DOCUMENT:

| | | | |
|---|---|---|---|
| -- 0 062 941 | 10/82 | EPO | A61B/5/10 |
| 0 326 768 | 8/9/89 | EPO | |
| 0 359 773 | 3/28/90 | EPO | |
| 0 427 358 | 5/15/91 | EPO | |
| 0 456 103 | 11/13/91 | EPO | |
| 0 469 966 | 2/5/92 | EPO | |
| 0 501 993 | 5/11/96 | EPO | |
| 0 581 704 | 2/2/94 | EPO | |
| 2 094 590 | 9/15/82 | UK (Abele et al.) | |
| 62-000327 | 1/6/87 | Japan | |
| DE3205085A1 | 9/23/82 | Germany | |
| WO 88/09151 | 12/1/88 | PCT | |
| WO 90/05494 | 5/13/90 | PCT | |
| WO 91/04711 | 4/18/91 | PCT | |
| WO 91/07726 | 5/30/91 | PCT | |

UNITED STATES PATENT AND TRADEMARK OFFICE
CERTIFICATE OF CORRECTION

PATENT NO. : 6,009,212
DATED : December 28, 1999
INVENTOR(S) : Michael I. Miller et al.

It is certified that error appears in the above-identified patent and that said Letters Patent is hereby corrected as shown below:

| | | |
|---|---|---|
| DE3 508 730 Al | 9/18/86 | Germany |
| WO 92/06645 | 4/30/92 | PCT |
| WO 94/23647 | 10/27/94 | PCT |
| WO 94/24933 | 11/10/94 | PCT |
| WO 96/11624 | 4/25/96 | PCT |
| WO 93/20528 | 10/14/93 | PCT -- |

OTHER PUBLICATIONS,

-- Davitokas, C.A. et al., "Image Registration Based on Boundary Mapping," Johns Hopkins University, March 1995.
International Search Report, PCT/US98/23619, April 12, 1999.
Yukio Kosugi et al., "An Articulated Neurosurgical Navigation System Using MRI and CT Images," *IEEE Transactions on Biomedical Engineering*, Vol. 35, No. 2, pp. 147-152, Feb. 1988.
Ralph Mösges et al., "A New Imaging Method for Intraoperative Therapy Control in Skull-Base Surgery," *Neurosurg.*, Rev. 11, pp. 245-247, 1988.
David W. Roberts, M.D., et al., "A Frameless Stereotaxic Integration of Computerized Tomographic Imaging and the Operating Microscope,"*J. Neurosurg., Vol.* 65, pp. 545-9, Oct. 1986.
Arun-Angelo Patil, M.D., "Computed Tomography Plane of the Target Approach in Computed Tomographic Stereotaxis," *Neurosurgery*, Vol. 15, No. 3, pp. 410-4, 1984.
H. Reinhardt, et al., "A Computer Assisted Device for the Intraoperative CT-Correlated Localization of Brain Tumors," *Eur. Surg. Res.*, Vol. 20, pp. 52-8, 1988.
Eric H. Friets, et al., "A Frameless Stereotaxic Operating Microscope for Neurosurgery," *IEEE Transactions on Biomedical Engineering*, Vol. 36, No. 6, June 1989.
Pixsys, Inc., "SACDAC User's Guide, Version 2e," March 1989, pp.0-1 through 5-3.
Ludwig Adams et al., "Medical Imaging: Computer-Assisted Surgery," *IEEE Computer Graphics and Applications*, pp. 43-51, May 1990.
Eric E. Awwad et al.,"MR Imaging of Lumbar Juxtaarticular Cysts," *Journal of Computer Assisted Tomography*, Vol. 14 No. 3, pp. 415-7, May/June 1990.
Eric E. Awwad et al., "Post-Traumatic Spinal Synovial Cyst with Spondylolysis CT Features," *Journal of Computer Assisted Tomography*, Vol. 13, No.2, pp. 334-37, March/April 1989.

UNITED STATES PATENT AND TRADEMARK OFFICE
CERTIFICATE OF CORRECTION

PATENT NO. : 6,009,212
DATED : December 28, 1999
INVENTOR(S) : Michael I. Miller et al.

It is certified that error appears in the above-identified patent and that said Letters Patent is hereby corrected as shown below:

Edward C. Benzel et al., "Magnetic Source Imaging: A Review of the Magnes System of Biomagnetic Technologies Incorporated," *Neurosurgery*, Vol 33, No.2, pp. 252-9, August 1993.
L. Adams et al., "Aide Au Reperage Tridimensionnel Pour La Chirugie De La Base Du Crane," Innov. Tech. Biol. Med., Vol. 13, No. 4, pp. 329-41, 1992.
Richard D. Bucholz et al., "A Comparison of Sonic Digitizers Versus Light Emitting Diode-Based Localization," *Interactive Image-Guided Neurosurgery*, Chapter 16, pp 179-200.
Bucholz, R.D., et al., "Use of an Intraoperative Optical Digitizer in a System for Free-Hand Stereotactic Surgery," Poster #1120, Scientific Program, 1992 Annual Meeting, American Association of Neurological Surgeons, San Francisco, CA, April 11-16, 1992, pp. 284-285.
Richard D. Bucholz et al., "Image-Guided Surgical Techniques for Infections and Trauma of the Central Nervous System," *Neurosurgery Clinics of North America*, Vol. 7, No. 2, pp. 187200, April 1996.
Richard D. Bucholz et al., "Intraoperative Localization Using a Three Dimensional Optical Digitizer," *Proceedings of Clinical Applications of Modern Imaging Technology*, Vol. 1894, The International Society of Optical Engineering, pp. 312-22, January 17-19, 1993.
Richard D. Bucholz et al., "Variables Affecting the Accuracy of Stereotactic Localization Using Computerized Tomography," J. *Neurosurg.*, Vol. 79, pp. 667-673, November 1993.
Richard D. Bucholz, "The Central Sulcus and Surgical Planning," *AJNR*, Vol. 14, pp. 926-7, July/August 1993.
Richard D. Bucholz et al., "Halo Vest Versus Spinal Fusion for cervical injury: evidence from an outcome study," *J. Neurosurg.*, Vol. 70, No.6, pp.884-892, June 1989.
Guillaume Champleboux, "Utilisation De Fonctions Splines Pour La Mise Au Point d'Un Capteur Tridimensionnel Sans Contact," 7/1991.
G. Champleboux, et al., "Accurate Calibration of Camerass and Range Imaging Sensors: the NPBS Method," IEEE Conference on Robitics and Automation, 1992.
P. Cinquin et al., "Computer Assisted Medical Interventions," TARP, p.63-65, September 1989. Philippe Cinquin et al., "IGOR: Image Guided Robot. Methodology, Applications," *IEEE EMBS*, pp. 1-2, 1992.
Bill Dever and S. James Zinreich, M.D., "OR role seen for 3-D imaging," Radiology Today, 2 pages, February 1991.
Kevin T. Foley et al, "Image-Guided Intraoperative Spinal Localization," *Intraoperative Neuroprotection*, Chapter 19, pp. 325-40, 1996.

UNITED STATES PATENT AND TRADEMARK OFFICE
CERTIFICATE OF CORRECTION

PATENT NO. : 6,009,212
DATED : December 28, 1999
INVENTOR(S) : Michael I. Miller et al.

It is certified that error appears in the above-identified patent and that said Letters Patent is hereby corrected as shown below:

Christopher C. Gallen et al., "Intracranial Neurosurgery Guided by Functional Imaging," *Surg. Neurol.*, Vol. 42, pp. 523-30, January 3, 1994.
Edmund M. Glaser et al., "The Image-Combining Computer Microscope-an Interactive Instrument for Morphometry of the Nerous System," *Journal of Neuroscience Methods*, Vol. 8, pp.17-32, 1983.
Patrick Clarysse et al., "A Computer-Assisted System for 3-D Frameless Localization in Stereotaxic MRI," *IEEE TOMA*, Vol. 10, No. 4, pp. 523-9, Dec. 1991.
John G. Golfinos et al., "Clinical Use of a Frameless Stereotaxic Arm: results of 325 cases," *J. Neurosurg.*, Vol. *83, No. 3, pp.* 197-205, Aug. 1995.
J.F. Hatch et al., "Reference-Display System for the Integration of CT Scanning and the Operating Microscope," Proceedings of the Eleventh Annual Northeast Bioengineering Conference, pp. 252-254, March 15, 1985.
Jaime M. Henderson et al., "An Accurate and Ergonomic Method of Registration for Image Guided Neurosurgery," Computerized Medical Imaging and Graphics, Vol. 18, No. 4, pp. 273-277, 1994.
Skip Jacques et al., "A Computerized Microstereotactic Method to Approach, 3-Dimensionally Reconstruct, Remove and Adjuvantly Treat Small CNS Lesions," Appl. *Neurophysiol.*, Vol. 43, pp. 176-182, 1980.
Patrick J. Kelly, "Instrumentation, Technique and Technology," *Neurosurgery*, Vol. 37, No. 2, pp. 348-350, Aug. 1995.
Douglas Kondziolka et al., "Guided Neurosurgery Using the ISG Viewing Wand," *Contemporary Neurosurgery*, Vol. 17, No. 8, pp. 1-6, 1995.
Krybus et al., "Navigation Support for Surgery by Means of Optical Position Detection," Lehrstuhl fur MeBbtechnik.
S. Lavallee, "A New System for Computer Assisted Neurosurgery," IEEE Engineering in Medicine & Biology Society llth Annual International Conference, 2 pages, 1989.
Stephane Lavallee, "Vi Adaptation De La Methdologie A Quelques Applications Cliniques," Lére Partie: Methodologie des GMCAO, Chapter VI, pp. 133-148.
S. Lavallee, et al, "Computer Assisted Driving of a Needle into the Brain," CAR, p. 416-20, 1989.
S. Lavallee et al., "Computer Assisted Interventionist Imaging: The Instance of Stereotactic Brain Surgery," MEDINFO, pp. 613-617, 1989.
Mazier et al., "Chirurgie De La Colonne Vertebrale Assiste Par Ordinateur: Application Au Vissage Pediculaire," *Innov. Tech. Biol. Med*, Vol. 11, No. 5, pp. 559-566, 1990.

UNITED STATES PATENT AND TRADEMARK OFFICE
CERTIFICATE OF CORRECTION

PATENT NO. : 6,009,212
DATED : December 28, 1999
INVENTOR(S) : Michael I. Miller et al.

It is certified that error appears in the above-identified patent and that said Letters Patent is hereby corrected as shown below:

B. Mazier et al., "Computer Assisted Interventionist Imaging: Application to Vertebral Column Surgery," Annual International Conference of the IEEE Engineering in Medicine and Biology Society, Vol. 12, No. 1, pp. 0430-1, 1990

F. Mesqui et al., "Real-Time, Noninvasive Recording and Three-Dimensional Display of the Functional Movements of an Arbitrary Mandible Point," *SPIE Biostereometrics '85*, Vol. 602, pp. 77-84, December 3-6, 1985.

Stéphane Lavallée et al., "Computer Assisted Medical Interventions," NATO ASI Series, Vol. F60, p. 302-12, 1990.

André Olivier et al., "Frameless stereotaxy for surgery of the epilepsies: preliminary experience" *J. Neurosurg.*, Vol. 81, No. 4, pp. 629-33, Oct. 1994.

C.A. Pelizzari et al., "Interactive 3D Patient-Image Registration" *Information Procession in Medical Imaging, Proceedings*, pp. 132-141, July 1991.

Richard D. Penn et al., "Stereotactic Surgery with Image Processing of Computerized Tomographics Scans," *Neurosurgery*, Vol. 3, No. 2, pp. 157-163, May 26, 1978.

H. F. Reinhardt et al., "Mikrochirurgische Entfernung tiefliegender GefaBmiBbildungen mit Hilfe der sonar-Stereometrie," *Ultraschall in Med.* 12, pp. 80-4, 1991.

H. F. Reinhardt et al., "Neuronavigation: A Ten-Year Review," Neurosurgery, Vol 23, pp. 329-341 (1992).

Hans F. Reinhardt et al., "Sonic Stereometry in Microsurgical Procedures for Deep-Seated Brain Tumors and Vascular Malformations," *Neurosurgery*, Vol. 32, No. 1, pp. 329-341, Jan. 1993.

Pascal Sautot, et al., "Computer Assisted Spine Surgery: a First Step Toward Clinical Application in Orthopaedics," *14th IEEE EMBS*, pp. 1071-1072, 1992.

Christine S. Siegel, "Creating 3D Models from Medical Images Using AVS," Research Paper, N.Y.U. School of Medicine, 4 pages.

D.A. Simon, et al., "Accuracy Validation in Image-Guided Orthopaedic Surgery," Research Paper, Canegie Mellon University and Shadyside Hospital, pp. 185-192.

Kurt R. Smith et al., "The Neurostation TM--A Highly Accurate, Minimally Invasive Solution to Frameless Stereotactic Neurosurgery," *Computerized Medical Imaging and Graphics*, Vol. 18, No. 4, pp. 247-256, 1994.

Kurt R. Smith et al., "Multimodality Image Analysis and Display Methods for Improved Tumor Localization in Stereotactic Neurosurgery," *Annual Conference of the IEEE Engineering in Medicine and Biology Society*, Vol. 13, No. 1, pp. 0210, 1991

Watanabe, "Neuronavigator," *Iqaku-no Ayumi*, Vol. 137, No. 6, 4 pages, May 10, 1986 (with translation).

James M. Balter, et al., "Correlation of projection radiographs in radiation therapy using open curve segments and points," *Med. Phys.* 19 (2), Mar/Apr 1992, pp. 329-334.

UNITED STATES PATENT AND TRADEMARK OFFICE
CERTIFICATE OF CORRECTION

PATENT NO. : 6,009,212
DATED : December 28, 1999
INVENTOR(S) : Michael I. Miller et al.

It is certified that error appears in the above-identified patent and that said Letters Patent is hereby corrected as shown below:

B. Leonard Holman, et al., "Computer-Assisted Superimposition of Magnetic Resonance and High-Resolution Technetium-99-m-HMPAO and Thallium-201 SPECT Images of the Brain, *The Journal of Nuclear Medicine*, Vol. 32, No. 8, August 1991, pp. 1478-1484.

Kurt R. Smith, et al., "Computer Methods for Improved Diagnostic Image Display Applied to Stereotactic Neurosurgery," *Automedica*, Vol. 14, pp. 371-382, 1992.

C.A. Pelizzari, et al., "3D Patient/Image Registration: Application to Radiation Treatment Planning, *Medical Physics*, Vol. 18, No. 3, May/Jun 1991, p. 612.

D.J. Valentino, et al., "Three-Dimensional Visualization of Human Brain Structure-Function Relationships, *The Journal of Nuclear Medicine*, October 1989, Posterboard 1136, Vol. 30, No. 10, p. 1747.

David N. Levin, et al., "The Brain: Integrated Three-dimensional Display of MR and PET Images," *Radiology*, September 1989, Vol. 172, No. 3, pp. 783-789.

C.A. Pelizzari, et al., "Interactive 3D Patient-Image Registration," *Lecture Notes in Computer Science*, Springer-Verlag, Wye, UK, 1991 Proceedings, pp. 132-141.

D. Levin, et al., "Multimodality 3-D View of the Brain Created from MRI and PET Scans," *SMRI 1989: Seventh Annual Meeting Program and Abstracts*, Vol. 7, Supplement 1, p. 89.

C.A. Pelizzari, et al., "Three Dimensional Correlation of PET, CT and MRI Images," *The Journal of Nuclear Medicine, Abstract Book*, 34th Annual Meeting, Toronto, Canada, 1987, Vol. 28, No. 4, Poster Session No. 528, p. 682.

Patrick J. Kelly, M.D., et al., "A Stereotactic Approach to Deep-Seated Central Nervous System Neoplasms Using the Carbon Dioxide Laser," *Surgical Neurology*, Vol. 15, No. 5, May 1981, pp. 331-334.

Skip Jacques, M.D., et al., "Computerized three-dimensional stereotaxic removal of small central nervous system lesions in patients," *J. Neurosurg*, Vol. 53, No. 6, December 1980, pp. 816-820.

P.J. Kelly, et al., "Precision Resection of Intra-Axial CNS Lesions by CT-Based Stereotactic Craniotomy and Computer Monitored C02 Laser," *Acta Neurochirurgica*, SPRINGER-Verlag 1983, Vol. 68, 1983, pp. 1-9.

Patrick J. Kelly, M..D., et al. "A Microstereotactic Approach to Deep-seated Arteriovenous Malformations," *Surgical Neurology*, Vol. 17, No. 4, April 1982, pp. 260-262.

Y.C. Shiu, et al., "Finding the Mounting Position of a Sensor by Solving a Homogeneous Transform Equation of Form AX=XB," IEEE, 1987, pp.1666-1671.

UNITED STATES PATENT AND TRADEMARK OFFICE
CERTIFICATE OF CORRECTION

PATENT NO. : 6,009,212
DATED : December 28, 1999
INVENTOR(S) : Michael I. Miller et al.

It is certified that error appears in the above-identified patent and that said Letters Patent is hereby corrected as shown below:

K.S. Arun et al., "Least-Squares Fitting of Two 3-D Point Sets," Transactions on Pattern Analysis and Machine Intelligence, IEEE, Vol. PAMI-9, No. 5, 1987, pp. 698-770.
Castleman, Kenneth R., "Digital Image Processing," Prentice Hall, Inc., 1979, pp. 364-369. Afshar, Farhad, et al., "A three-dimensional reconstruction of the human brain stem," J. Neurosurg., Vol. 57, Oct. 1982, pp. 491-495.
S. Lavalee, et al., "Matching 3-D Smooth Surfaces with their 2-d Projections using 3-D Distance Maps," SPIE, Vol. 1570, 1991, pp. 322-336.
Bajcsy, Ruzena, et al., "Computerized Anatomy Atlas of the Human Brain," Proceedings of the Second Annual Conference & Exhibition of The National Computer Graphics Association, Inc., June 14-18, 1981, pp. 435-441.
Batnitzky, Solomon, M.D., et al., "Three-Dimensional Computer Reconstructions of Brain Lesions from Surface Contours Provided by Computed Tomography: A Prospectus," Neurosurgery, Vol. 11, No. 1, 1982, pp. 73-84.
Bergström, Mats, et al., "Stereotaxic Computed Tomography," *Am. J. Roentgenol*, 127:167-170, 1976, pp. 167-170.
Birg, W., et al., "A Computer Programme System for Stereotactic Neurosurgery," *Acta Neurochirurgica Suppl.*, 24, 1977, 99-108.
Boëthius, J., et al., "Stereotactic Biopsies and Computer Tomography in Gliomas," Acta *Neurochirurgica*, Vol. 40, Fasc. 3-4, 1978, pp. 223-232.
Boethius, J., et al., "Stereotaxic computerized tomography with a GE 8800 scanner," *J. Neurosurg*, Vol. 52, 1980, pp. 794-800.
Brown, Russell A., M.D., "A computerized tomography-computer graphics approach to stereotaxic localization," *J. Neurosurg*, Vol. 50, 1979, pp. 715-720.
Gildenberg, Philip L., M.D., et al., "Calculation of Stereotactic Coordinates from the Computed Tomographic Scan," *Neurosurgery*, Vol. 10, No. 5, 1982, pp. 580-586.
Gleason, Curtis A., Ph.D., et al., "Stereotactic Localization (with Computerized Tomographic Scanning), Biopsy, and Radiofrequency Treatment of Deep Brain Lesions," *Neurosurgery*, Vol. 2, No. 3, 1978, pp. 217-222.
Jacques, Skip, M.D., et al., "Computerized three-dimensional stereotaxic removal of small central nervous system lesions in patients," J. *Neurosurg*, Vol. 53, December 1980, pp. 816-820.
Lunsford, L. Dade, M.D., "Innovations in Stereotactic Technique Coupled with Computerized Tomography," *Contemporary Neurosurgery*, 1982, pp. 1-6.
Perry, John H., Ph.D., et al., "Computed Tomography-guided Stereotactic Surgery: Conception and Development of a New Stereotactic Methodology," *Neurosurgery*, Vol. 7, No. 4, October 1980, pp. 376-381.

UNITED STATES PATENT AND TRADEMARK OFFICE
CERTIFICATE OF CORRECTION

PATENT NO.   : 6,009,212
DATED        : December 28, 1999
INVENTOR(S)  : Michael I. Miller et al.

It is certified that error appears in the above-identified patent and that said Letters Patent is hereby corrected as shown below:

Piskun, Walter S., Major, et al., "A Simplified Method of CT Assisted Localization And Biopsy of Intracranial Lesions," *Surgical Neurology*, Vol. II, January-June 1979, pp. 413-417.
Scarabin, J.M., et al., "Stereotaxic Exploration in 200 Supratentorial Brain Tumors," *Neuroradiology*, Vol. 16, June 4-10, 1978, pp. 591-593.
Mundinger, F., et al., "Computer-Assisted Stereotactic Brain Operations by Means Including Computerized Axial Tomography," *Applied Neurophysiology*, Vol. 41, Nos. 1-4, 1978, pp. 169-182.
Perry, et al., Emission and Transmission Spect Data Combination in Interactive 3D Image Presentation, *The Journal of Nuclear Medicine*, May 1989, p. 835.
Tsui, et al., Three-dimensional Display Methods for Image Data Obtained with Spect, *European Journal of Nuclear Medicine*, August 1989, p. 639.
Penn, et al., Stereotactic Surgery with Image Processing of Computerized Tomographic Scans, *Neurosurgery*, Vol. 3, No. 2, 1978, pp. 157-163.
Rosenman, et al., Three-dimensional Display Techniques in Radiation Therapy Treatment Planning, *Int'l. Journal of Radiation Oncology Biology, Physics*, January 1989, pp. 263-269.
Davis, et al., Three-dimensional High-resolution Volume Rendering (Hrvr) of Computed Tomography Data: Applications to Otolaryngology - Head and Neck Surgery, *Laryngoscope*, June 1991, pp. 573-582.
Rosenman, et al., Vistanet: Interactive Real-time Calculation and Display of 3-Dimensional Radiation Dose: an Application of Gigabit Networking, *International Journal of Radiation Oncology Biology, Physics*, January, 1993, pp. 123-129.
Heinz, et al., Examination of the Extracranial Carotid Bifurcation by Thin-section Dynamic Ct: Direct Visualization of Intimal Atheroma in Man (Part 1), *American Journal of Neuroradiology*, July/August 1984, pp. 355-359.
The Dynasight™ Sensor; a Precision Optical Radar. High-performance Machine Vision for the VMEbus.
The Future of Medicine, *the Economist, pp 1 -18*; March 19-25, 1994.
Hatch, Reference-Display System for the Integration of CT Scanning and the Operating Microscope, Master of Engineering Thesis, Dartmouth College, Hanover, N.H., October 1984. Evans et al., "Three-Dimensional Correlative Imaging: Application in Human Brain Mapping," Academic Press, Inc. (1994).
Toga, Arthur W., "Visualization and Warping of Multimodality Brain Imagery," Academic Press, Inc. (1994).
Bookstein, Fred L., "Landmarks, Edges, Morphometrics, and the Brain Atlas Probelm," Academic Press, Inc. (1994).

UNITED STATES PATENT AND TRADEMARK OFFICE
CERTIFICATE OF CORRECTION

PATENT NO. : 6,009,212
DATED : December 28, 1999
INVENTOR(S) : Michael I. Miller et al.

It is certified that error appears in the above-identified patent and that said Letters Patent is hereby corrected as shown below:

Christensen, et al., "3D Brain Mapping Using a Deformable Neuroanatomy," Phys. Med. Biol. 39, Pp. 608-618 (1994).
Christensen, et al., "Volumetric Transformation of Brain Anatomy," (3/96).
Rabbit et al., "Mapping of hyperelestic deformable templates using the finite element method," SPIE Paper No. 2573-23 (6/95).
Rabbitt et al., "Mapping Inter-Subject Variations in Tissue Geometry," ASME Bioengineering Conference, Beaver Creek, CO.
Lemke et al., "Computer Assisted Radiology: Proceedings of the International Symposium on Computer and Communication Systems for Image Guided Diagnosis and Therapy," Springer (1995).
Christensen et al., "Synthesis of an Individualized Cranial Atlas with Dysmorphic Shape," (6/96).
Christensen et al., "A 3D Deformable Infant CT Atlas," CAR 96: Computer Assisted Radiology Elservier, New York, June 1996 pp. 847-852.
Christensen et al., "Individualizing Neuro-anatomical Atlases Using a Massively Parallel Computer," IEEE (1996).
Christensen et al., "Automatic Analysis of Medical Images Using a Deformable Textbook,"
CAR 95: Computer Assisted Radiology, Springer Verlad, Berlin, June 1995, pp. 146-151.
Haller et al., "A Comparison of Automated And Manual Segmentation of Hippocampus MR Images," SPIE Vol. 2434 (3/95).
Haller et al., "Hippocampal MR Morphometry by General Pattern Matching," Radiology, 1996, Vol. 199, pp. 787-791.
Bookstein, Fred L., Landmarks, Edges, Morphometrics and the Brain Atlas Problem," 8/28/1992.
Bajcsy et al., "A Computerized System for the Elastic Matching of Deformed Radiographic Images to Idealized Atlas Images," Journal of Computer Assisted Tomography, Raven Press (8/1983).
Bajcsy, Ruzena, "Three-Dimensional Analysis and Display of Medical Images," Positron Emission Tomography," Alan R. Liss, Inc., Pp. 119-129 (1985).
Dann et al., "Evaluation of Elastic Matching System for Anatomic (CT, MR) and Functional (PET) Cerebral Images," Journal of Computer Assisted Tomography, Raven Press, Ltd., (July/August 1989).
Bajcsy et al., "Evaluation of Registration of PET Images With CT Images," (11/1988).
Bajcsy et al., "Multiresolution Elastic Matching," (10/1987).

UNITED STATES PATENT AND TRADEMARK OFFICE
CERTIFICATE OF CORRECTION

PATENT NO. : 6,009,212
DATED : December 28, 1999
INVENTOR(S) : Michael I. Miller et al.

It is certified that error appears in the above-identified patent and that said Letters Patent is hereby corrected as shown below:

Evans et al., "Warping of a Computerized 3-D Atlas to Match Brain Image Volumes for Quantitative Neuroanatomical and Functional analysis," SPIE Vol. 1445 Image Processing (1991) pp. 236-246.
Collins et al., "An Automated 3D Non-Linear Image Deformation Procedure for Determination of Gross Morphometric Variability in Human Brain," SPIE Vol. 2359 (3/94).
Undrill et al., "Integrated Presentation of 3D Data Derived from Multi-Sensor Imagery and Anatomical Atlases Using a Parallel Processing System," SPIE Vol. 1653 Image Capture, Formatting, and Display (1992).
Amit, Yali, "A Non-Linear Variational Probelm For Image Matching," Division of Applied Mathematics Brown University.
Amit, Yali, "Graphical Shape Templates for Deformable Model Registration," Department of Statistics, University of Chicago.
Fritsch et al., "The Multiscale Medial Axis and Its Applications In Image Registration," Elsevier Science B.V., Pattern Recognition Letters 15, Pp. 445-452 (1994).
Vemuri et al., "Multiresolution Stochastic Hybrid Shape Models with Fractal Priors," ACM Transations on Graphics, Vol. 13, No. 2, Pp. 177-207 (April 1994).
Davatzikos et al., "Image Registration Based on Boundary Mapping," IEEE Trans on Image Processing Feb. 1996, Vol. 15, no. 1, pp. 112-115.
Davatzikos et al., "An Active Contour Model for Mapping the Cortex," IEEE TMI, March 1995, Vol. 14, pp. 65-80.
Davatzikos et al., "Brain Image Registration Based on Curve Mapping," IEEE (1994).
Davatzikos et al., "Brain Image Registration Based on Cortical Contour Mapping," IEEE (1994).
Davatzikos et al., "Adaptive Active Contour Algorithms for Extracting and Mapping Thick Curves," IEEE (1993).
Cootes et al., "Use of Active Shape Models for Locating Structures in Medical Images," Butterworth-Heinemann Ltd., Image and Vision Computing, Volume 12, Number 6, July/August 1994.
Sozou et al., "Non-Linear Generalization of Point Distribution Models Using Polynomial Regression," Elsevier Science B.V., Image and Vision Computer, Vol. 13, No. 5 (6/1995).
Cootes et al., "Combining Point Distribution Models with Shape Models Based on Finite Element Analysis," Elsevier Science B.V., Image and Vision Computing, Vol. 13, No. 5 (6/1995).

UNITED STATES PATENT AND TRADEMARK OFFICE
CERTIFICATE OF CORRECTION

PATENT NO. : 6,009,212
DATED : December 28, 1999
INVENTOR(S) : Michael I. Miller et al.

It is certified that error appears in the above-identified patent and that said Letters Patent is hereby corrected as shown below:

Cootes et al., "Active Shape Models - Their Training and Application," Academic Press, Inc., Computer Vision and Image Understanding, Vol. 61, No. 1, Pp. 38-59 (1/1995).
Hill et al., "Medical Image Interpretation: A Generic Approach Using Deformable Templates," Taylor & Francis, Ltd., Med. Inform. Vol. 19, No. 1, Pp. 47-59 (1994).
Woods et al., "Rapid Automated Algorithm for Aligning and Reslicing PET Images," Raven Press, Ltd., Journal of Computer Assisted Tomography, Vol. 16, No. 4 (1992).
Woods et al., "MRI-PET Registration with Automated Algorithm," Raven Press, Ltd., Journal of Computer Assisted Tomography, Vol. 17, No. 4 (1993).
Fox et al., "A Stereotactic Method of Anatomical Localization for Positron Emission Tomography," Raven Press, Journal of Computer Assisted Tomography, Vol. 9, No. 1 (1985). Pelizzari et al., "Accurate Three-Dimensional Registration of CT, PET, and/or MR Images of the Brian," Raven Press, Ltd., Journal of Computer Assisted Tomography, Vol. 13, No. 1 (1989).
Greitz et al., "A Computerized Brain Atlas: Construction, Anatomical Content, and Some Application," Raven Press, Ltd., Journal of Computer Assisted Tomography, Vol. 15, No. 1 (1991).
Evans et al., "Image Registration Based on Discrete Anatomic Structures."
Lerios et al., "Feature-Based Volume Metamorphosis," Computer Graphics Proceedings, Annual Conference Series (1995).
Toga, Arthur W., "Three-Dimensional Neuroimaging," Raven Press.
Friston et al., "Plastic Transformation of PET Images," Raven Press, Journal of Computer Assisted Tomography, Vol. 15, No. 4 (1991).
Friston et al., "Special Registration and Normalization of Images," Wiley-Liss, Inc. (1995). Melter et al., "Vision Geometry IV," SPIE Proceedings, Vol. 2573 (1995).
Gramkow, Claus, "Registration of 2D and 3D Medical Images," Lyngby 1996, IMM-EKS1996, pp. 1-325.

UNITED STATES PATENT AND TRADEMARK OFFICE
CERTIFICATE OF CORRECTION

PATENT NO. : 6,009,212
DATED : December 28, 1999
INVENTOR(S) : Michael I. Miller et al.

It is certified that error appears in the above-identified patent and that said Letters Patent is hereby corrected as shown below:

Mauer, Jr. et al., "A Review of Medical Image Registration," Interactive Image-Guided Neurosurgery, Chapter 3, pp. 17-44.
Gee et al., "Bayesian Approach to the Brain Image Matching Problem," SPIE Vol. 2434, pp. 145-156.
Collins et al., "Automatic 3D Intersubject Registration of MR Volumetric Data in Standardized Talairach Space," Journal of Computer Assisted Tomography, Vol. 18, No. 2, 1994, pp. 192-205. --

Signed and Sealed this

Twenty-fifth Day of December, 2001

Attest:

JAMES E. ROGAN
*Attesting Officer*     *Director of the United States Patent and Trademark Office*